(12) United States Patent
Hendricks et al.

(10) Patent No.: US 8,588,395 B2
(45) Date of Patent: Nov. 19, 2013

(54) CUSTOMER SERVICE METHODS, APPARATUS AND REPORT/ALERT GENERATION BASED ON CUSTOMER SERVICE CALL INFORMATION

(75) Inventors: James William Hendricks, Purcellville, VA (US); Joy Somers, King, NC (US); Dianne Keener Blackwood, Greensboro, NC (US); Suzanne Elizabeth Curtis, Fort Mill, SC (US)

(73) Assignee: Time Warner Cable Enterprises LLC, New York, NY (US)

( * ) Notice: Subject to any disclaimer, the term of this patent is extended or adjusted under 35 U.S.C. 154(b) by 1457 days.

(21) Appl. No.: 12/136,893

(22) Filed: Jun. 11, 2008

(65) Prior Publication Data
US 2009/0310774 A1 Dec. 17, 2009

(51) Int. Cl.
*H04M 3/00* (2006.01)
*G06Q 10/00* (2012.01)

(52) U.S. Cl.
USPC ............. 379/265.02; 705/7.11; 379/265.13

(58) Field of Classification Search
USPC ............ 379/265.02, 265.11, 265.12, 266.07; 705/7.11
See application file for complete search history.

(56) References Cited

U.S. PATENT DOCUMENTS

| | | | |
|---|---|---|---|
| 5,506,898 A * | 4/1996 | Costantini et al. | 379/266.06 |
| 6,449,341 B1 * | 9/2002 | Adams et al. | 379/9 |
| 6,829,348 B1 * | 12/2004 | Schroeder et al. | 379/265.09 |
| 7,707,599 B1 * | 4/2010 | Groff et al. | 725/5 |
| 7,929,685 B1 * | 4/2011 | Boyet et al. | 379/265.02 |
| 2004/0042612 A1 * | 3/2004 | Michelson et al. | 379/265.13 |
| 2005/0286709 A1 * | 12/2005 | Horton et al. | 379/265.09 |
| 2006/0062375 A1 * | 3/2006 | Pasquale et al. | 379/265.12 |
| 2006/0245580 A1 * | 11/2006 | Hein et al. | 379/265.12 |
| 2007/0022000 A1 * | 1/2007 | Bodart et al. | 705/10 |
| 2007/0133780 A1 * | 6/2007 | Berner et al. | 379/265.01 |
| 2008/0262904 A1 * | 10/2008 | Conway et al. | 705/11 |

* cited by examiner

*Primary Examiner* — Duc Nguyen
*Assistant Examiner* — Sonia Gay
(74) *Attorney, Agent, or Firm* — Straub & Pokotylo; Michael P. Straub; Stephen T. Straub

(57) ABSTRACT

Methods and apparatus that provide customer service representatives with information for supporting a customer service call are described. Also described are method and apparatus for collecting customer service call information and generating reports and/or alerts there from. Through the use of customer service call data from multiple divisions, problems and/or underperformance at a division can be identified and rectified in a timely manner. Information from one division can also be used to predict possible problems at other divisions allowing problems to be addressed, in some cases, prior to customer complaints at a division to be addressed in some cases before an increase in the number of customer service calls at the individual division triggers an alert.

15 Claims, 18 Drawing Sheets

JOHN SMITH - CALL CENTER ADVISOR
DESKTOPS  LOGOUT

| 09:14A | 00:03 | ACCOUNTS | HISTORY | PAYMENTS | ADJUSTMENTS | OFFERS | DISPOSITION | CUSTOMER: DORIS JOHNSON |
|---|---|---|---|---|---|---|---|---|
| 2 | | CUSTOMER HISTORY | LEDGER | →WORK ORDER | | | | ACCOUNT #:222237503 |

TASKS
- DETAIL SEARCH
- BILLING INQUIRY
- CANCEL WORK ORDER
- CHANGE EXISTING
- COLLECTION
- EQUIPMENT
- INSTALL
- NON-PAY DISCONNECT
- RECONNECT
- REQUESTED DISCONNECT
- RESCHEDULE WORK ORDER
- SEASONAL DISCONNECT
- SERVICE CHANGE
- SPECIAL REQUEST
- TRANSFER SERVICES
- TROUBLE CALL

LINKS
- GOOGLE
- ANYWHO
- YAHOO

WORK ORDER HISTORY — 902

| STATUS | CKIN | WO # | ENTERED | SCHED | TIME SCHED | COMPL | TYPE | CAT | QUOTA | CODE |
|---|---|---|---|---|---|---|---|---|---|---|
| CP | YES | 3774961 | 05-13-2004 | 05-20-2004 | 2P-4P | 05-20-2004 | IN | D | 1 | ROAD RUNNER |
| CP | YES | 11128187 | 06-20-2005 | 06-21-2005 | 2P-4P | 06-21-2005 | TC | D | 5 | TROUBLE CALL |

WORK ORDER DETAILS — 904

| TECH # | 1882 | SALES DATE | 05-13-2004 |
|---|---|---|---|
| JOB SEQUENCE | 0002 | START BILLING DATE | 05-20-2004 |
| SCHEDULED DATE | 05-20-2004 | DEPOSIT | 0.00 |
| SCHEDULED TIME | 2P-4P | COD | 31.97 |
| CHECKED IN USER | BESMITH | PRORATE | 31.97 |
| WORK ORDER ENTERED | 05-13-2004 | INSTALL | 0.00 |
| TECHNICIAN ASSIGNED | 05-19-2004 14:00 | MONTHLY SERVICE | 31.97 |
| LAST CHANGED | 05-13-2004 | MONTHLY TOTAL | 29.95 |
| CHECK IN | 05-20-2004 11:04 BESMITH | CAMPAIGN CODE | 00777 |
| ORIGINAL SCHEDULE | 05-20-2004 ARRIVAL TIME: 11:02 | SALES REPRESENTATIVE | 2332 |

ALERTS

ACTIVITIES
OPEN (0)
ENTERED  JOB # / TYPE  SCHEDULED
LAST COMPLETED
ENTERED  JOB # / TYPE  CLOSED
06/20/2005  TC  11325478  06/21/2005

OFFERS X-SELL/UP-SELL
7 ALL THE BEST $129.95
ALL THE BEST BUNDLE INCLUDES DIGIPIC 1000, DIGITAL PHONE AND ROAD RUNNER ELK. THE MORE PRODUCTS A CUSTOMER HAS, THE MORE THEY SAVE

TRANSITION FROM SERVICE TO SALES:
MR./MRS. CUSTOMER, BEFORE I LET YOU GO TODAY I WANTED TO MAKE YOU AWARE OF SOME SPECIAL BUNDLING WE CAN OFFER YOU ON YOUR CABLE SERVICES. WE HAVE THE ALL THE BEST PACKAGE THAT OFFERS YOU DIGITAL PHONE, ROAD RUNNER, AND DIGITAL CABLE ALL FOR JUST $129.95 PER MONTH. (ALL AREAS)

EDUCATE CUSTOMER ON BENEFITS -
MORE...
[ACCEPT] [DECLINE]
OFFERS - SAVES  [OFFER NOT MADE]  GO TO SAVES

CUSTOMER SERVICE METHODS, APPARATUS AND REPORT/ALERT GENERATION BASED ON CUSTOMER SERVICE CALL INFORMATION

FIELD

Various embodiments relate to methods and apparatus for supporting customer service and for using information collected from customer services operations and, more particularly, to methods and apparatus that provide customer service representatives with information for supporting a customer service call and/or which generate various reports and/or alerts based on information collected as part of the process of responding to customer calls.

BACKGROUND

Customer service representatives are often responsible for servicing a wide range of incoming calls. To service a call effectively and in an efficient manner, it is important that a customer service representative be supplied with customer specific information in a convenient, easy to access manner, e.g., on a display screen of an operator workstation.

Responding to a customer's inquiry regarding the purchase of services or products, service outages, billing issues, etc., and being able to address those issues by updating information and/or initiating work orders can be important in satisfying a customer. However, customer service calls provide the customer service representatives, and thus the service provider they represent, an opportunity to offer additional services, features or upgrades, sometimes referred to as "upselling" which can result in additional revenue being generated for the service provider. To maximize such upselling opportunities, it would be desirable if customer offers could be targeted to individual customers based on their specific account information, as opposed to the customer being presented with a standard offer presented perhaps based on the call type but not on the specific customer account details.

Customer service calls offer a particularly valuable opportunity to collect data and identify system problems. Unfortunately, customer service representatives are usually located in various locations, e.g., at individual divisions, and the information to which they are exposed in terms of customer complaints, reports of faults, billing errors, etc. often get addressed on an individual basis without the information being used to support detection and correction of fundamental problems or to trigger preemptive action which could avoid a problem encountered in one region from occurring or becoming significant in another region.

In view of the above discussion, it should be appreciated that there is a need for new and improved ways of selecting offers to be presented to customers during customer service calls. There is also a need for collecting call information, e.g., information on the reasons for calls, information on the number of calls e.g., for a given reason, and disposition results. It would be particularly useful is such information could be collected and processed into reports, e.g., for different divisions of a company where each division may correspond to a different geographic region. With regard to division reports it would be useful if information in reports corresponding to one time interval can be examined and compared with information corresponding to other time intervals to identify problems and/or trends which may be evident from a review of the collected call information. It would also be desirable if call related information corresponding to one division could be compared to call related information corresponding to one or more other divisions in an attempt to identify problems at one division which may be evident from a review of information across divisions but may not seem unusual at a given division.

While being able to review and analyze call information to identify problems and generate alerts is desirable, it is preferable that such analysis and alerts can be generated in near real time, e.g., within one or a few hours of call information for a period of time being collected.

In view of the above discussion, it should be appreciated that there is a need for improvement in the way customer service calls are handled and how information generated from the handling of those calls is used to improve system reliability, efficiency and/or provide other benefits.

SUMMARY

Methods and apparatus that provide customer service representatives with information for supporting a customer service call are described. Also described are method and apparatus for collecting customer service call information and generating reports therefrom.

In accordance with some aspects, customer specific data, e.g., billing data, is accessed and used to select a customer specific offer to the caller. The selected offer may be displayed on the screen of the customer service representative as the call is serviced with the customer service representative presenting the offer at an appropriate time.

Since customer specific data is used in the selection of the offer to be presented, the offer is likely to be of greater interest to the user than a general offer selected randomly. In addition since knowledge of the customer's current services is used in selection of the offer, offers for services to which the customer already subscribes or offers for lower levels of services, e.g., smaller channel packages, than those to which the customer already subscribes can be excluded from the set of possible offers. Offers of particular interest which may be selected for presentation may include discount offers for upgrading from a current service level to which the customer already subscribes to the next highest or another higher level of service which can be described in the offer information presented to the operator. Offer selection rules may be used as part of the offer selection process. In some embodiments offer call results from multiple calls at a division and/or multiple divisions are monitored and the offer selection rules updated based on successful offers to increase the probability that an offer will be properly targeted and accepted during future calls.

In accordance with another aspect, call information, e.g., from multiple divisions, is collected and analyzed, e.g., at a central location. Collected call information includes, depending on the embodiment, information on the reasons for calls, the number of calls, the number of calls of a particular type, and disposition results. The disposition results may indicate how a problem or issued raised in the call was resolved or addressed. For purposes of analysis calls may be grouped into call groups according to such things as the reason for the call and the call deposition. However, grouping of calls into other categories according to other characteristics is also contemplated.

In some embodiments call information is collected, e.g., in a central database used to store call information relating to multiple divisions, and processed into reports and used to generate alerts. A variety of different types of reports can be generated depending on the embodiment, e.g., reports for different divisions of a company where each division may correspond to a different geographic region. Reports providing information about customer service calls corresponding to multiple regions may also be generated to facilitate comparison and analysis of customer service calls across regions.

In some embodiments call information, call information for a given division corresponding to one time interval is examined and compared with call information for the same division corresponding to other time intervals to identify problems and/or trends which may be evident from a review of the collected call information. Problems which may be detected in this manner include increases in hardware failures, increases in billing errors and other types of problems which may be detectable from an increase in a particular number of calls complaining about billing issues or hardware failures for example. Such increases may be indicative of a systematic problem that needs to be identified and addressed. Sales trends, e.g., rate of offer acceptances, of particular offers is also useful and can be detected from the call information. The offer acceptance rate can be used in refining the offer selection rules and identifying which customers are likely to accept which particular offers.

In accordance with some aspects, call related information corresponding to one division is compared to call related information corresponding to one or more other divisions. This is done to identify problems at one division which can be detected by that division having significantly different call rates for particular categories of calls. To facilitate comparison of call rates for different divisions, the call information may be normalized, e.g., to a per subscriber call rate or on some other basis to take into consideration the fact that different divisions may have different numbers of subscribers.

In accordance with various embodiments, alerts and/or reports are generated based on the analysis performed. Alerts and/or reports can be generated and transmitted by E-mail or as data files and then are printed or displayed at the individual division headends.

Given that call information is collected and supplied to a system capable of promptly processing the information, alerts and reports can be generated on a real time, near real-time, or longer term basis. Thus, based on call rates and information obtained from calls, service, billing and network problems can be identified and addressed promptly as opposed to waiting for a problem to be identified though some other method which might take considerably longer. In addition, problems detected at one division can be used to avoid the same problem occurring at other divisions, e.g., divisions in later time zones, where a particular problem might not occur for a few hours due to the difference in time zones and system loading corresponding to behavioral patterns relating to the time of day.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIGS. 5, 6, 7, 8, 9, 10, 11, 12 illustrate different exemplary screen displays of an operator workstation display device showing various features displayed on the screen in accordance with the present invention.

DETAILED DESCRIPTION

Figure 1:
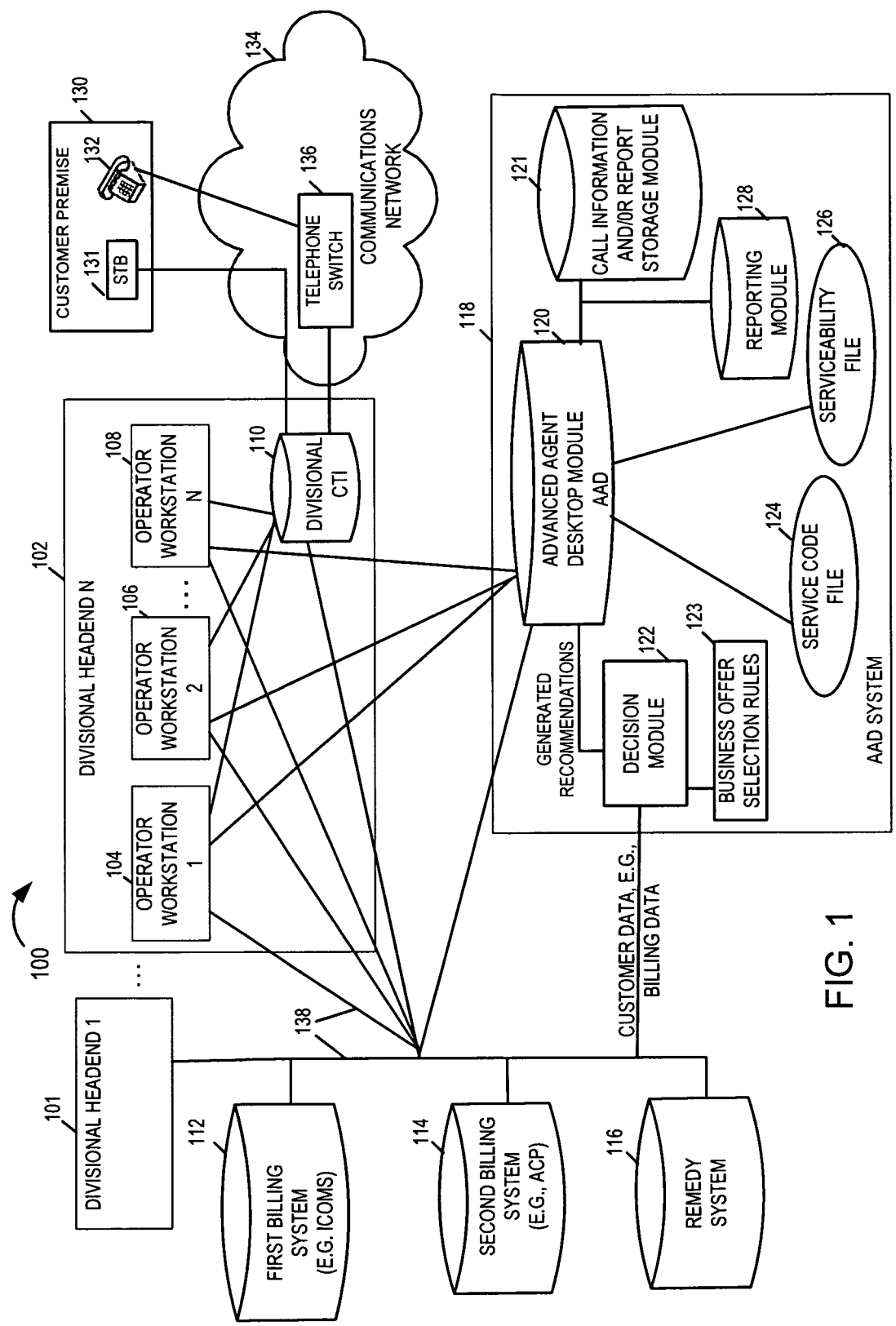
FIG. 1 illustrates an exemplary system with various distributed servers/systems and divisional headends, implemented in accordance with the present invention.

FIG. 1 illustrates an exemplary system 100 including various distributed servers, e.g., billing servers, and sub-systems which support various customer service operations, e.g., generation of customer specific offers for presenting to customers, resolving account and/or billing related issues, reporting of customer problems and/or other relevant data to, e.g., one or more divisional customer service centers, in accordance with various embodiments of the present invention. The exemplary system 100 includes a plurality of servers and sub-systems including a first billing system 112, a second billing system 114, a Remedy system 116 and the advanced agent desktop (AAD) system 118. The first billing system 112 may be implemented as an integrated communications operations management system (ICOMS) while the second billing system 114 may be implemented as an ACP system which is available from CSG Systems. The different billing systems may serve different divisions.

System 100 also includes a plurality of divisional headends, e.g., divisional headend 1 101, . . . , divisional headend N 102. Individual headends, e.g., headend N 102, are coupled to customer premises such as representative customer premise 130 via a communications network 134. The communications network 134 may include a cable network, telephone network or both a cable and telephone network. Individual customer premises include communications devices such as set top box 131 and telephone 132. Via telephone 132 a customer can contact, e.g., call the divisional headend responsible for providing service to the customer premises by dialing a customer service telephone number corresponding to the headend providing service to the customer, e.g., headend N 102.

As shown in FIG. 1, various servers and subsystems of the system 100 are connected via bus, e.g., an enterprise service bus (ESB) 138, over which data can be exchanged in either way between various elements and systems connected by the bus 138. Thus, operators working at headends 101, 102 can be supplied with information and control signals from other elements in the system, e.g., the first and second billing subsystems 112, 114 and/or the AAD system 118 which can access the billing system 112, 114. A divisional headend may be, e.g., a divisional office used to provide services for a geographic region corresponding to the division. A divisional headend may include a customer call center or be serviced by a corresponding customer call center located external to the division. In the embodiment illustrated in FIG. 1, the divisional headend includes a customer call center which includes a plurality of operator workstations 104, 106, 108, and a Computer Telephone Integration (CTI) server 110. Operator workstation 1 104, operator workstation 2 106, . . . , operator workstation N 108 each include a display device on which customer and call related information can be displayed and an input device, e.g., keyboard which can be used by an operator to enter or retrieve information relating to the call or the customer account corresponding to the caller. In some embodiments each of the operator workstation in a divisional headend, e.g., operator workstations 104, 106, 108, may be coupled to the ESB 138 and may exchange data and/or other information with other sub-systems, e.g., billing systems 112 and 114, via ESB 138. Divisional computer telephony integration (CTI) system 110 interfaces between one or more telephone switches 136 in the network 134 and the operator workstations 104, 106, 108. The divisional CTI 110 includes a plurality of call queues to which incoming customer calls are assigned, e.g., after the caller enters a number indicating the type of call being received, e.g., a service, billing, sales or general call, in response to a voice prompt from the CTI system 110. Call queues included in the CTI system include a service call queue, a billing inquiry call queue; and a sales call queue.

The CTI system 110 may also prompt the caller for account identification information, e.g., account number or address corresponding to the location where service is being provided, so that the account information can be retrieved, e.g., from one of the billing systems 112, 114 under control of the AAD system 118. The CTI server 110 can interact with the AAD system 118 and/or various other systems via the ESB 138. In this manner, call queue and account information corresponding to a call received at the divisional CTI 110 can be communicated to AAD system 118. The CTI system 110 is responsible for assigning calls to operator workstations 104, 106, 108, e.g., based on the call queue to which the call has been assigned and the availability of an operator qualified to service calls from the queue to which the incoming call has been assigned.

As will be discussed in more detail later in the sections that follow, an operator workstation, in some embodiments includes an interface via which it can attend to customer calls, in addition to a display screen where the customer service representative (CSR) can view the customer account and/or other information.

In some implementations the CTI system 110 will not have initiated retrieval of account information corresponding to a customer, e.g., due to an input error or because the system is configured to wait for a Customer Service Representative to request information from the caller before initiating account information retrieval.

In some such implementations, a CSR greets the customer and asks for either a customer account number so that the CSR can pull up the account summary information and/or billing information from a customer database for the particular customer who has called. Further information, e.g., account and/or billing information, can be retrieved from different servers via the enterprise service bus 138. In some embodiments, such information is furnished when a request is made by a CSR. Requests for information may be made through the AAD system 118 allowing the system to monitor information being retrieved and make business offer suggestions to the operator based on the user's specific account details as will be discussed below in addition to other things such as the incoming call queue to which the call being serviced was assigned.

Remedy system 116 is a ticketing system which may, and in some embodiments is, coupled to various divisional headends via the ESB 138. In some embodiments remedy system 116 is implemented on a server at one of the divisional headends or at a central/regional office of the service provider. In some other embodiments a remedy system 116 may be implemented at each of the divisional headends, e.g., divisional headends 101, . . . , 102. Remedy system 116 is responsible for generating tickets for customer calls which, e.g., need to be escalated, to a different group of skilled staff For example, some customers may encounter technical or other problems which a CSR may not be able to resolve. In such a situation a CSR logs the customer problem and generates a ticket by accessing remedy system 116, so that the problem may be escalated to the next level of staff that can address and resolve the problem. In some embodiments, when a ticket is generated by the remedy system 116, the problem is automatically escalated to the senior staff depending on the nature of problem as logged by the CSR. For example, if the problem is concerned with a technical issue, the problem may be escalated automatically to a technical specialist or a manager of technical staff If the problem is rather concerned with a billing related issue then the problem may be escalated to, e.g., a manager responsible for resolving billing and account related issues.

The advanced agent desktop AAD system 118 includes a plurality of different modules for performing different functions in accordance with the present invention. The AAD system 118 includes an AAD module 120, call information and/or report storage module 121, a decision module 122, business offer selection rules 123, a reporting module 128, a service code file 124 and a serviceability file 126. The AAD module 120, among other things, is responsible for coordinating and controlling the operation of other modules in the AAD system 118. It also operates as a control module for populating a customer service representative screen and determines what information will be provided to a CSR representative as part of call servicing. The AAD module 120 integrates different pieces of information/data received by the system 118 and provides information to various operator workstations in different divisional headends, in a consolidated form. In some embodiments, the AAD module may be coupled to individual operator workstations 104, 106, . . . , 108, for communicating data and/or other information to/from the operator workstations. The AAD system 118 may be implemented at, e.g., a central and/or regional office of the service provider. In some embodiments the AAD system 118 is also capable of exchanging information with various other distributed servers, e.g., first billing system 112, second billing system 112, remedy system 116, etc., via the ESB 138. In some embodiments, exchange of information between the AAD system 118 and various distributed servers may occur via, e.g., a direct communication link. Another function performed by the AAD module 120 is that it captures/receives customer call data, e.g., data logged by the customer service representative while attending to a customer call, from various divisional headends and performs analyses on the captured/received data. In some embodiments, the received data may be stored in the call information and/or report storage module 121. Thus, in some embodiments AAD module 120 stores the analyzed call data in the call information and/or report storage module 121 after performing analysis, generating report and, possibly generating alerts as a result of the analysis outcome.

The decision module 122 is a decision making module which uses a set of business strategies and rules, e.g., business offer selection rules 123 and customer specific information, for selecting one or more business offers for presenting to a customer. Accordingly while illustrated as a decision module, decision module 122 in some embodiments is an offer selection module. Thus, decision module 122 is responsible for selecting one or more business offers from a pool of business offers that are available based on customer specific data and/or call queue information. For example, module 122 may exclude from possible offers an offer for a service to which the caller already subscribed while selecting an offer for a discount on a service upgrade from a service to which the customer currently subscribes to an higher level service package. In some embodiments the decision module 122 makes this decision based on at least two inputs, e.g., two or more pieces of customer specific information such as billing information, current services, serviceability, geographic location, competitive offer potential, credit scoring and/or other relevant data that the decision module 122 may receive from various billing systems/servers. The selection of the offer is made based on and in accordance with a set of business offer selection rules 123. Once the decision module 122 makes a decision as to which business offer(s) are selected for presenting to a customer, it makes the information regarding the selected business offers available to the AAD module 120. The AAD module 120 processes the information received from decision module 122 and presents this information on the CSR display screen so that such a selected business offer can be presented to a customer on call.

The service code file 124 includes information for mapping different available service codes to a corresponding word/text version of these service codes so that they can be displayed on the operator workstation display screen. For example, various services available to customers, e.g., unlimited calling, high-speed internet, video-on demand etc. are stored in the database as binary numbers which represent service codes corresponding to those services. The service code file 124 includes information that maps the service codes to their corresponding meaning in text form which can be displayed on the operation display screen so that a CSR can read and understand what the available service really is. For example service code 0011 may correspond to, e.g., a high speed internet service. The service code file 124 does the relevant mapping that service code 0011 correspond to high speed internet service, and makes the information available so that it can be displayed. The serviceability file 126 includes information on which screen components to display for different services.

Reporting module 128 is responsible for generating various reports in accordance with the invention including reports related with customer service operations for various divisions and/or regions. The reporting module 128 uses the call information data analyzed by the AAD module 120 to generate various reports. Generated reports include contact view summary report, disposition reason detail report, agent (CSR) sales/saves report, agent (CSR) handling summary report, agent level supervisors report, cross sell report, and a number of other reports. The generated reports will be discussed later in the sections that follow. The generated reports may be, and sometimes are, stored in the call information and/or report storage 121. The generated reports may be, and sometimes are, sent to various divisional headends via E-mail and/or as data files where they are printed and/or otherwise displayed. In some embodiments, one or more of the reports including information regarding new problems encountered by the customers may be sent to a central database where it can be accessed by system experts who can identify and resolve the source of problems, e.g., problems resulting in increased numbers of calls to customer service representatives.

Figure 2:
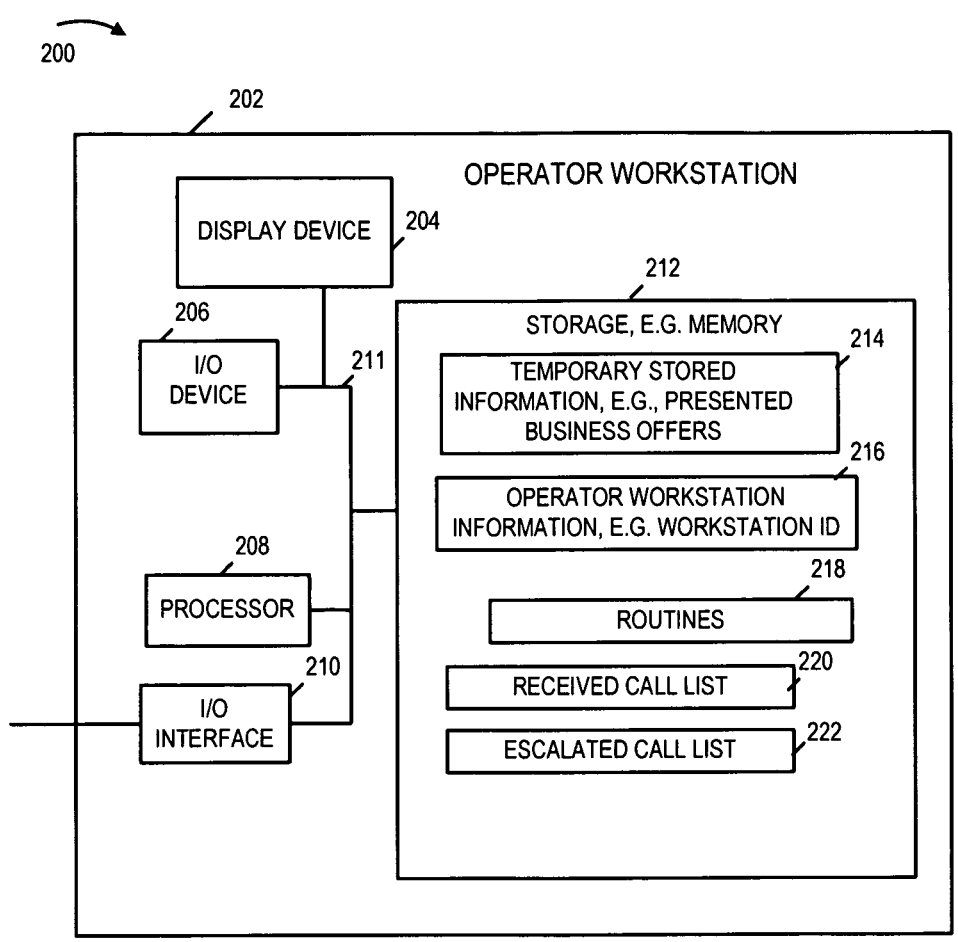
FIG. 2 illustrates an exemplary operator workstation which may be used by, e.g., a customer service representative, in accordance with the present invention.

FIG. 2 is a drawing 200 illustrating an exemplary operator workstation 202 implemented in accordance with one exemplary embodiment. The operator workstation 202 may be used as any one of the operator workstations 104, 106, 108 of the system shown in FIG. 1. As shown, operator workstation 202 is coupled to a display device 204, e.g. a monitor. The operator workstation 202 includes an Input/Output device 206, a processor 208, an Input/Output (I/O) interface 210, and a storage device, e.g. a memory 212 coupled together via a bus 211. The various elements of the operator workstation 202 can exchange data and information over the bus 211. The I/O device may be, e.g., a keypad, via which an operator/CSR may enter data and/or commands in the workstation 202.

The processor 208, e.g., a CPU, executes routines 218 stored in the memory 212 and, under direction of the routines 218, controls the operator workstation 202 to operate in accordance with the invention. To control the operator workstation 202, the processor 208 uses information and/or routines including instructions stored in memory 212.

Via the I/O interface 210, the operator workstation 202 can exchange signals and/or information with other devices, servers and/or systems such as the billing systems 112 and 114, in system 100 of FIG. 1. The I/O interface supports the receipt and/or transmission of data, information and/or content to/from different servers and systems. In addition to supporting the communication of content, I/O interface 208 further supports the communication of application and/or control signals between the operator workstation 202 and other servers and systems, e.g. CTI system 110. In some embodiments the operator workstation 202 may attend to customer calls via the I/O interface 210. In some other embodiments the operator workstation 202 includes a different interface via which it can attend to customer calls.

The memory 212 includes a module 214 for storing temporary information, operator workstation information 216, various routines 218, received call list 220, and escalated call list 222. The module 214 for storing temporary information may store, e.g., business offers presented by an operator/CSR during a period of time.

The operator workstation information 216 may be, e.g. an operator workstation ID, Media Access Control (MAC) address of the workstation, etc. and or other information stored in the operator workstation memory. In some embodiments, the MAC address is used for routing data, information and/or control signals to/from the operator workstation 202. Routines 218 include communications routines and/or operator workstation control routines.

The received call list 220 includes a list of customers from which calls have been received, e.g., during a period of time, by the operator/CSR of the operator workstation 202. The escalated call list 222 includes a information regarding the calls which are escalated to, e.g., different level of support and/or higher level staff For example if a CSR could not a resolution for a customer problem, the CSR may escalate the call to a higher level staff, e.g., a manager or supervisor. The escalated call list 222 may include information about the calls which are escalated, e.g., including customer information, reason for call, name of supervisor/manager to whom the call has been escalated etc.

Figure 3:
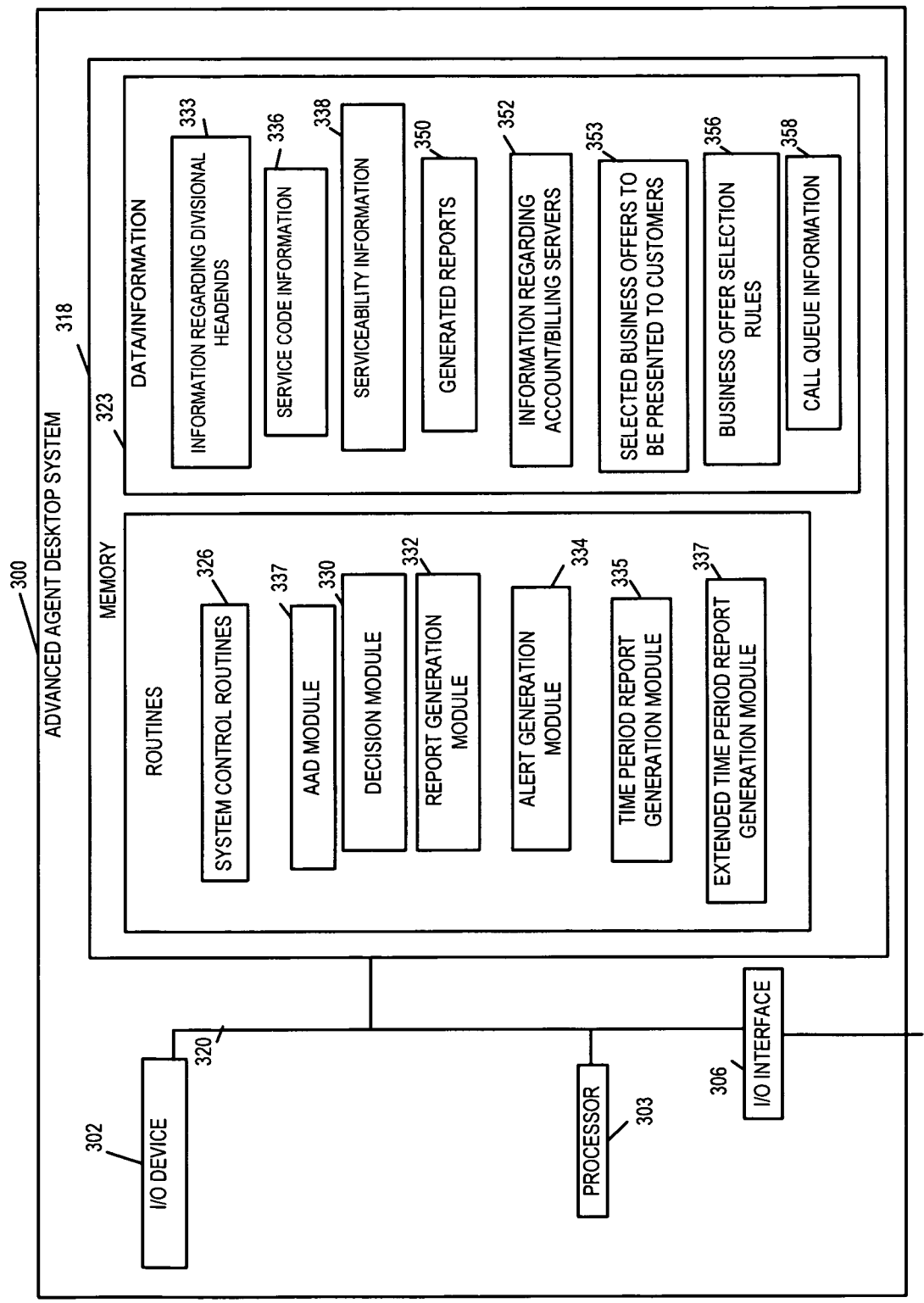
FIG. 3 illustrates an exemplary advanced agent desktop (AAD) system which may be used as the AAD system of FIG. 1, implemented in accordance with an exemplary embodiment.

FIG. 3 illustrates an advanced agent desktop system 300 implemented in accordance with the present invention. The system 300 maybe used as the system 118 shown in FIG. 1. The system 300 includes an Input/Output device or devices 302, a processor 303, I/O interface3 306 and a memory 318 coupled together via a bus 320. Via interface 306 the elements of the system 300 can receive and send information, commands, etc via direct links to the system 300 or via the ECB 138. The I/O devices 302 may include a keyboard, a display and a printer. The display and printer may be used to output reports on a screen or in hard copy, respectively.

The processor 303, which may be implemented as a CPU, controls operation of the AAD system under control of one or more of routines 321 stored in memory 318. In some embodiments, the processor controls the AAD system 300 to implement the method shown in FIG. 4. In addition to routines 321, memory 318 includes a set of data and information 323 which can be accessed, used and updated by one or more of the routines/module in the portion of memory 321.

The routines 321 includes system control routines 326, an AAD module for implementing various AAD functions, a decision module 330 for selecting offers, a report generation module 332 for generating reports, and an alert generation module 334 for generating alerts. In addition, the portion of memory 321 may include a time period report generation module 335 and an extended time period report generation module 337. The report generation module 332 may be implemented in accordance with the exemplary method shown in FIG. 15, with calls being made to the time period report generation module 335 and extended time period report generation module 337. The time period report generation module 335 may, and in some embodiments does, implement the method shown in FIG. 16 while the time report generation module may, and in some embodiments does, implement the method shown in FIG. 17.

The data/information 323 stored in memory 318 includes, for example, information regarding divisional headends 333, service code information 336, serviceability information 338, a set of generated reports 350, information regarding account and billing servers 352, a set of selected business offers which may be presented to customers 353, business offer selection rules 356 and call queue information 358.

The information regarding divisional headends 333 includes, for example, information on the number of subscribers serviced by each headend, the time zone in which the headend is located, IP address information corresponding to the headend, and which billing system is responsible for storing the account information for the particular headend. The service code information 336 includes information mapping service codes used by various headends to text information describing the service which corresponds to the stored codes. This text information may be displayed to an operator as opposed to the service code to facilitate operator understanding of the service to which a subscriber subscribes or an offer being presented to a subscriber. Serviceability information 336 includes information indicating which portions of a screen display, e.g., operator screen subwindows, are to be presented to a customer service representative when servicing a call corresponding to a particular service. Generated reports 350 include divisional and other reports generated in accordance with the invention, e.g., reports of the type shown in FIGS. 13 and 14. Information regarding account/billing servers 352 includes, for example, information on the IP address to be used to contact individual billing servers and the divisions which the server serves. The information may also include, for example, information on the information available from the billing server. this is useful where multiple billing servers 112, 114 are used and they may provide information in different formats and/or do not have available the same sets of account/billing information. Thus, different divisions may have different account/billing information available depending on which billing server 112, 114 is used to support billing at the division.

Selected business offers to be presented to customers 353 includes information to be used by an operator to present a sales offer, e.g., to upgrade a service, to a customer. Different divisions may have different business offers to present. Accordingly, in some embodiments, different sets of business offers 353 are stored for each of the individual divisions supported by the AAD system 300. Business offer selection rules include rules for selecting which the of the business offers are to be presented. As discussed above, the rules may be based on customer specific data used to select an offer available at the division which provides service to the customer. Individual divisions may upload different offer selection rules 356 to be used to select offers for customers serviced by the individual division. Call queue information 358 includes information on the status of call queues, e.g., the number of cases waiting for assignment to a customer representative at each of the various divisions, average call handling time, disposition information, etc. This information may be stored on a per division basis.

Figure 4A:
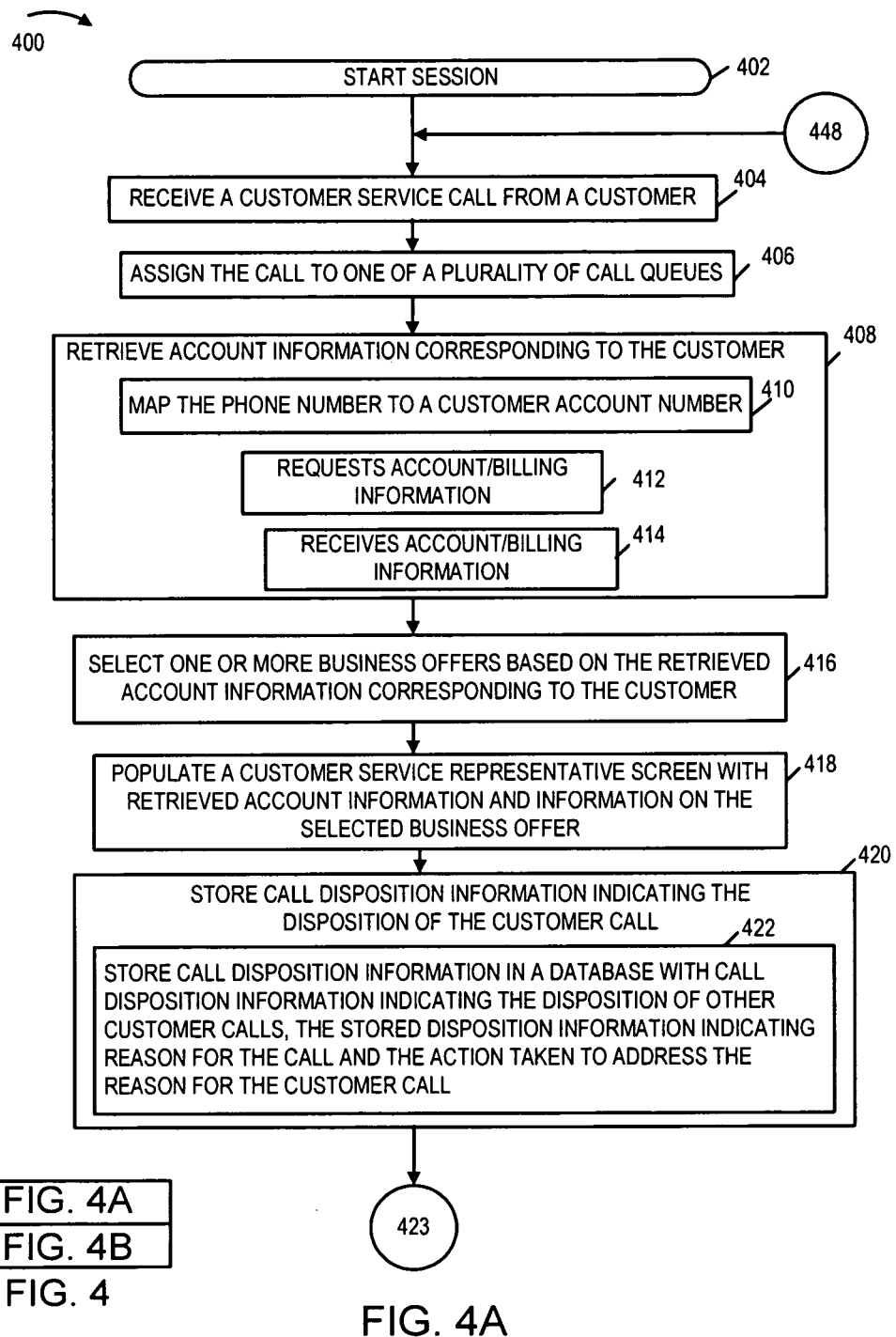
FIG. 4, comprising the combination of FIG. 4A and FIG. 4B, illustrates a flowchart of an exemplary method in accordance with the present invention.
Figure 4B:
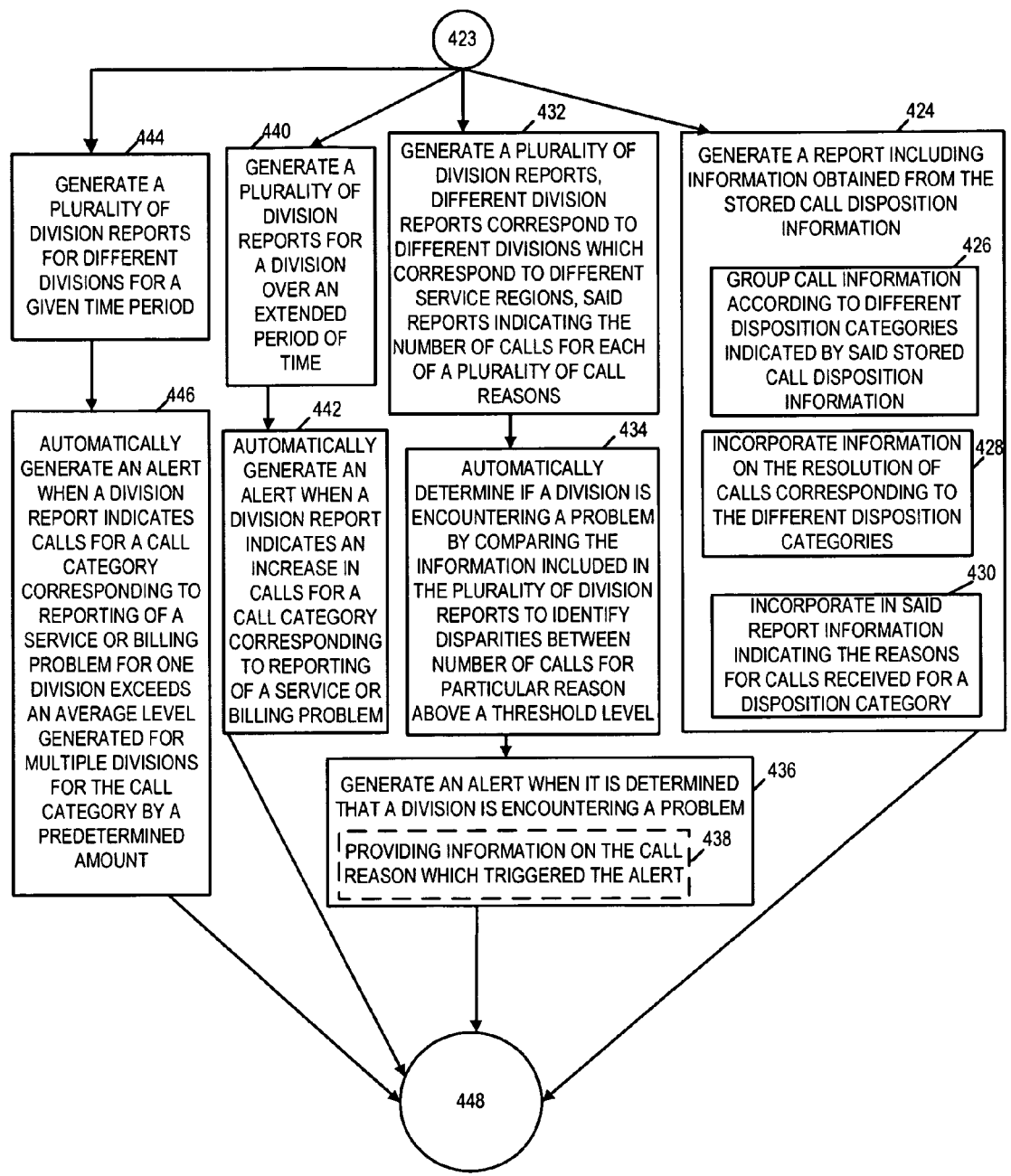

Having described various system components, the discussion will now be directed to an exemplary method of handling a customer call which will be discussed with reference to FIG. 4 which comprises the combination of FIGS. 4A and 4B. FIG. 4 which comprises the combination of FIGS. 4A and 4B, is a flowchart 400 showing the steps of an exemplary method of the present invention. Operation starts in step 402, e.g., with a divisional CTI 110 monitoring for customer calls. The operation proceeds from start step 402 to step 404. In step 404 a divisional CTI system, e.g., CTI system 110, receives a call and prompts for call category and customer account information. The operation proceeds from step 404 to step 406. In step 406, the received call is assigned, e.g., by the CTI system 110, to one of a plurality of call queues. In some embodiments the plurality of call queues includes at least two of a service call queue, a billing inquiry queue and a sales queue. The assignment of the received call to one of the call queues may be based on a customer's response to an initial automated voice response system which presents various available call queue options, e.g., a call queue number, to a customer. In such an event, the customer may respond by selecting one of the available options by speaking the call queue option or the option number. In some embodiments, the customer may press the call queue option number on his/her telephone keypad to select one of the available call queues. For example, a service call queue may be designated number 1, sales queue may be designated number 2, etc. The customer may simply press 1 on the keypad for service and 2 for sales. Based on the option selected by the customer, the call may be assigned to the appropriate queue. In some embodiments, the CTI 110 system notifies the AAD system 118 of the call, customer account and assignment of the call to a queue. The operation proceeds from step 406 to step 408.

In step 408, account information corresponding to the customer who made the call, is retrieved. In some embodiments, the step 408 may include sub-steps 410, 412 and 414. In sub-step 410, e.g., the CTI system 110 maps the phone number from which the customer is calling, to a customer account number in order to retrieve information regarding the customer. In sub-step 412 customer account/billing information is requested from one or more available systems, e.g., billing system 112 and/or billing system 114. In sub-step 414 the requested account/billing information is received, e.g., via a bus, e.g., ESB 138. The operation proceeds to step 416.

In step 416, a selection is made for one or more business offers based on the retrieved account information corresponding to the customer, e.g., by the decision module 122 of FIG. 1. In some embodiments, selecting a business offer to present to the customer includes selecting said business offer as a function of the call queue to which the customer service call was assigned. For example, in some embodiments if the call has been assigned to, e.g., a service call queue, then in some such embodiments the business offer will be selected by the decision module will be from a pool of service related business offers such as warranty offers and service repair offers. Thus in such embodiments, if the call is assigned to a service call queue then a service offer will be made, e.g., unlimited service for 1 year for a certain price.

In some embodiments if a call is assigned to a billing inquiry call queue, then, in that event selecting a business offer may, and sometimes does, include selecting from a plurality of payment plan offers, at least one of said payment plan offers including automatic billing to a credit card. In some embodiments when a call is assigned to a sales queue, selecting a business offer may, and sometimes does, include selecting from a plurality of service packages providing a greater number of services than a number of services to which the customer already subscribes as indicated by the retrieved account information. Thus, it should be appreciated that such a feature may significantly increase the chances that a customer will carefully consider the offer made, since the offer is being made in the category regarding which the customer has called. Thus such a feature may potentially increase up-selling significantly. The operation proceeds from step 416 to step 418.

In step 418, the operator/CSR workstation screen, e.g., operator workstation display device 204, is populated with retrieved account information and information on the selected business offer. In accordance with the invention, once the business offers are selected by the decision module 122, the AAD system 118 may then send the information including customer account and/or other details, along with the selected business offer(s) to the operator/CSR workstation. The operation proceeds from step 418 to step 420.

In step 420, the call disposition information indicating the disposition of the customer call is stored. In some embodiments, the step 420 may include a sub-step 422. In sub-step 422 the call disposition information is stored in a database which may include call disposition information indicating the disposition of other customer calls, the stored call disposition information indicating the reason for the call and the action taken to address the reason for the customer call. The call disposition information may be stored in a database which may also be storing call disposition information about the disposition of other customer calls, e.g., customers from a different division and/or region. The operation proceeds from step 420 to steps 424, 432, 440 and 444 via the connecting node 423. It should be appreciated that steps 424, 432, 440 and 444 may be performed in parallel in some embodiments. Also, not all of the steps 424, 432, 440 and 444, are necessarily performed in all embodiments. However, steps 424, 432, 440 and 444 do not necessarily have to be performed in parallel and in some embodiments they are performed sequentially as desired. In step 424 a report including information obtained from the stored call disposition information is generated, e.g., generated by the reporting module 128. In some embodiments the step 424 includes sub-steps 426, 428 and 430. In sub-step 426 the call information, e.g., call information which is captured from the information entered by a CSR while servicing the customer call, may be grouped according to different disposition categories indicated by said stored call disposition information. In sub-step 428 information on the resolution of calls corresponding to the different disposition categories may be incorporated in the generated report. In sub-step 430, information indicating the reasons for calls received for a disposition category may, and sometimes is, incorporated in the generated report. The operation proceeds from step 424 back to step 404 via the connecting node 448.

In step 432, a plurality of division reports are generated, e.g., by the reporting module 128. Different division reports correspond to different divisions which correspond to different service regions, the generated division reports indicating the number of calls for each of a plurality of call reasons. For example, in some embodiments a division report for each division corresponding to a service region may be generated. The generated report includes information, e.g., the number of calls received for each of a plurality of reasons for which the calls had been made. The operation proceeds from step 432 to step 434.

In step 434, an automatic determination is made, e.g., by the AAD module 120, to determine if a division is encountering a problem by comparing the information included in the plurality of division reports (e.g., those generated in step 432) to identify disparities between number of calls for particular reason above a threshold level. Thus a comparison is made by analyzing the information included in the generated division reports to detect if there are one or more call reasons for which divisions are receiving an increased number of calls, e.g., an increased number above a certain predetermined threshold level. Such a determination gives an indication a division for which an increased number of calls for some particular reasons is detected may be encountering a problem, e.g., an outage. The operation proceeds from step 434 to step 436.

Next in step 436, based on the determination that a division may be encountering a problem, an alert is generated, e.g., by the AAD module 120. The alert indicating that the identified division is encountering a problem. In some embodiments, step 436 may include an optional sub-step 438 wherein when the alert is generated, information on the call reason which triggered the alert is provided. It should be appreciated that such an alert may prove to be very helpful to, e.g., a central monitoring/administrative system, which can immediately act on the problem and take measures to resolve the problem that the division is encountering. The operation proceeds from step 436 back to step 404 via the connecting node 448.

In step 440, a plurality of division reports for a division are generated over an extended period of time. In this step, for each division, a number of divisional reports are generated over an extended period time. For example the extended period of time may be one day during which a number of divisional reports for a division are generated, e.g., every 3 hours. A division report may include, for example, call group information, total number of received calls for that division, per subscriber number of calls which is the ratio of total number of received calls to the total number of subscribers/customers in that division. Call group information indicates, e.g., service or billing related call groups and the reason for call. This will be discussed in greater detail later in the sections that follow. The operation proceeds to step 442. In step 442 an alert is automatically generated when a division report indicates an increase in calls for a call category corresponding to reporting of a service or billing problem. For example, if a division report from the plurality of generated division reports indicates that there is an increase in number of received calls, e.g., for service related problems, then an alert may be generated. The operation proceeds from step 442 back to step 404 via the connecting node 448.

In step 444, a plurality of division reports for different divisions are generated, e.g., by the reporting module 128, for a given time period. The operation proceeds from step 444 to step 446 wherein an alert is automatically generated, e.g., by the AAD module 120, when a division report indicates that calls for a call category corresponding to reporting of a service or billing problem for one division exceeds an average level generated for multiple divisions for that call category, by a predetermined amount. For example, an average report for multiple division is generated, e.g., at the end of the given time period. The average report for multiple divisions may include an average level of number of calls received for a call category, for multiple divisions. Now if a division report corresponding to a division indicates that number of calls received for that call category in that division exceeds the average level indicated in the average report for multiple divisions by a certain predetermined amount, then the AAD module 337 may generate an alert. The operation proceeds from step 446 back to step 404 via the connecting node 448.

Figure 5:
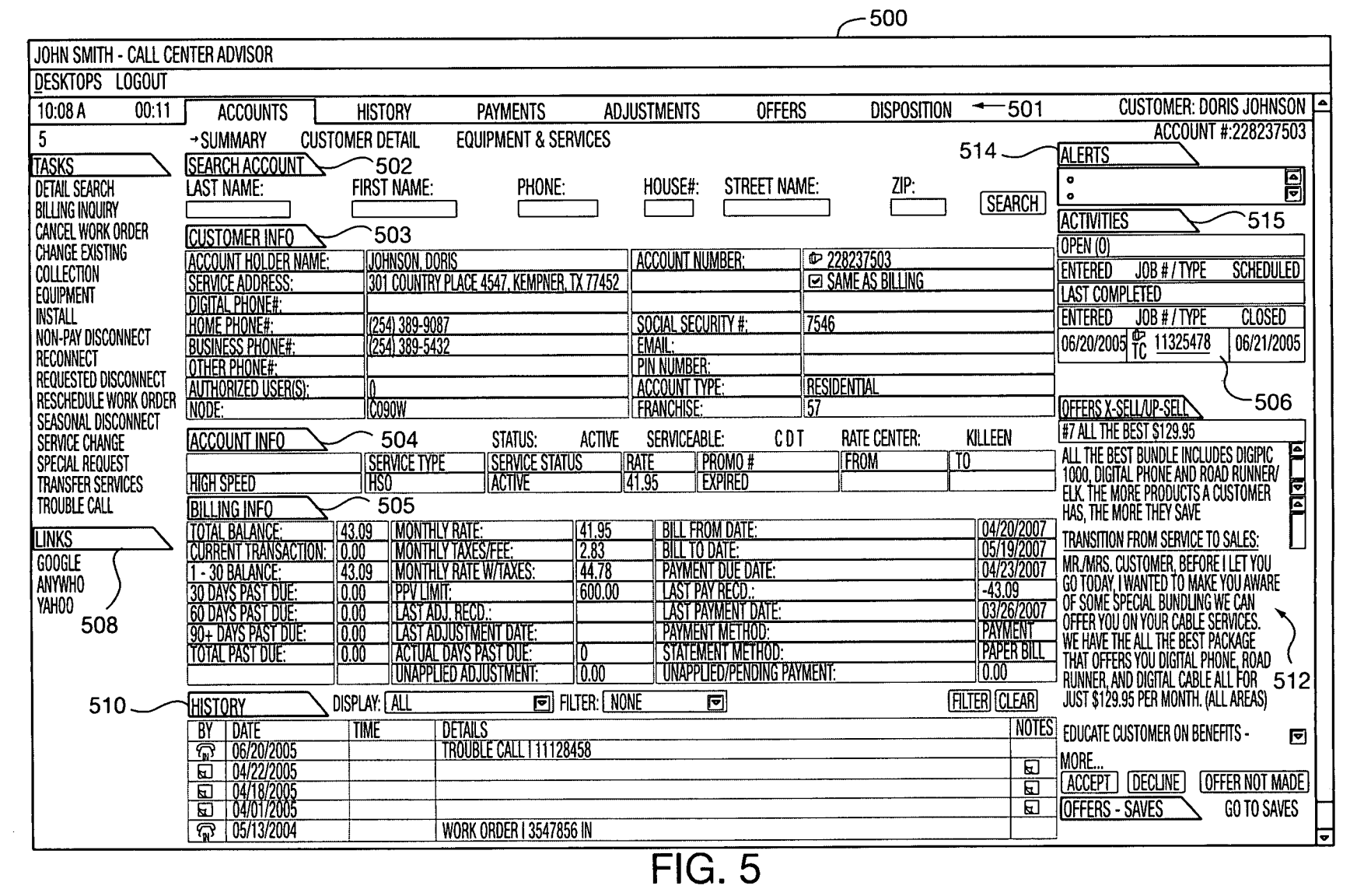

FIG. 5 illustrates an exemplary customer summary screen 500 displayed on an operator workstation display device 204 while servicing a customer call. The customer summary screen 500 is displayed on the screen of display device 204 in accordance with the present invention, e.g., at the start of servicing a customer call. The summary screen 500 serves as the main landing page for customer service representatives and provides information giving the operator an account overview as well as other information to be used in handling the call. This page incorporates key account information that customer representatives may need to address a customer's call.

As illustrated in FIG. 5, the center of the screen contains information needed to validate the customer as well as seeing a high level summary of the account. Towards the top of the screen in the row generally indicated by reference number 501, the operator is provided with a plurality of tabs which can be used to access various sets of information, e.g., many of which allow the operator to obtain more information than that provided on the account summary page shown in screen 500 of FIG. 5. For example, in addition to the Accounts tab which corresponds to the screen 500, the operator can select from a history tab, payments tab, adjustments tab, offers tab, and disposition tab, to gain access to a more detailed and or customized screen corresponding to the information associated with the particular tab. Tabs 501 may be selected, e.g., by double clicking on the individual tab.

The illustrated screen 500, in addition to the tabs 501, includes a plurality of fields, e.g., a search account field 502, customer information field 503, an account information field 504, a billing information field 505, a history field 510, a links field 508, an alerts field 514, an activities field 515, and an offers spotlight field 512. Many of the displayed fields provide a summary of more detailed information corresponding to the account of the customer being services with the detailed information being accessible by activation of the appropriate tab 501.

The search account field 502 provides the customer service representative servicing the call the opportunity to search for a customer account based on name, phone number, house number, street name and/or zip code, e.g., based on information provided by the caller. To conduct a search the operator can enter information and activate the search button.

Customer information field 503 includes, for example, the name of the account holder, e.g., the caller being serviced, the customer's account number, address, phone numbers along with account type information and/or other customer information that can be used for verifying the caller's account information and/or servicing the customer.

Account Information field which is identified by reference number 504 includes information regarding the type of service the customer is subscribed to, e.g., a high speed internet service, a cable T.V service etc. Account Information field 504 also includes, for example, information about the service status, e.g., whether the service is presently active or suspended for some reason, service rate information, period of subscription information etc.

The next field that is shown on the exemplary screen 500 is the billing information 505 which includes, e.g., consolidated billing information for customers. Field 505 provides pertinent information for basic billing questions that a customer may ask during a billing related inquiry.

Toward the bottom of the illustrated screen 500 appears the history field 510 where information regarding past interaction of one or more CSR's with the customer are provided, so that a CSR handling the customer's call may know the reason for the customers call in the past.

The alerts field 514 provides the CSR handling the customer call, specific information about outages impacting the customer. For example, customers of a region may be affected by a network outage which might have resulted in temporary discontinuation of service. In such a case a CSR may receive a large number of calls from customers of the affected region. By knowing that the customer is affected by an outage, the CSR can quickly and satisfactorily respond to the customer on call and inform them of such an outage.

The activities field 515 includes information, e.g., regarding any open work orders or trouble tickets on the account along with the last completed work order. The activities field 515 allows the CSR to open that work order and view its information in the event that it is the reason for the customer call. In field 515, additional information on any cases that are related to the customer account may also be displayed.

Offer spotlight field 512 includes information on a guided and scripted sales process, to encourage up-selling by a CSR during customer calls. Field 515 also allows for non-financial customer service tactics, for example, prompting the CSR to enroll a customer in a payment program or offering the customer a "thank you" gift based on criteria on the customer account. In addition to up-sell offers, offer spotlight field 512 also provides a guided process for retention calls as well. Based on customers response to offers made during the call, data is provided in standardized reporting to the customer care and marketing groups to help these areas understand the success of the offers being presented to the customers.

Figure 6:
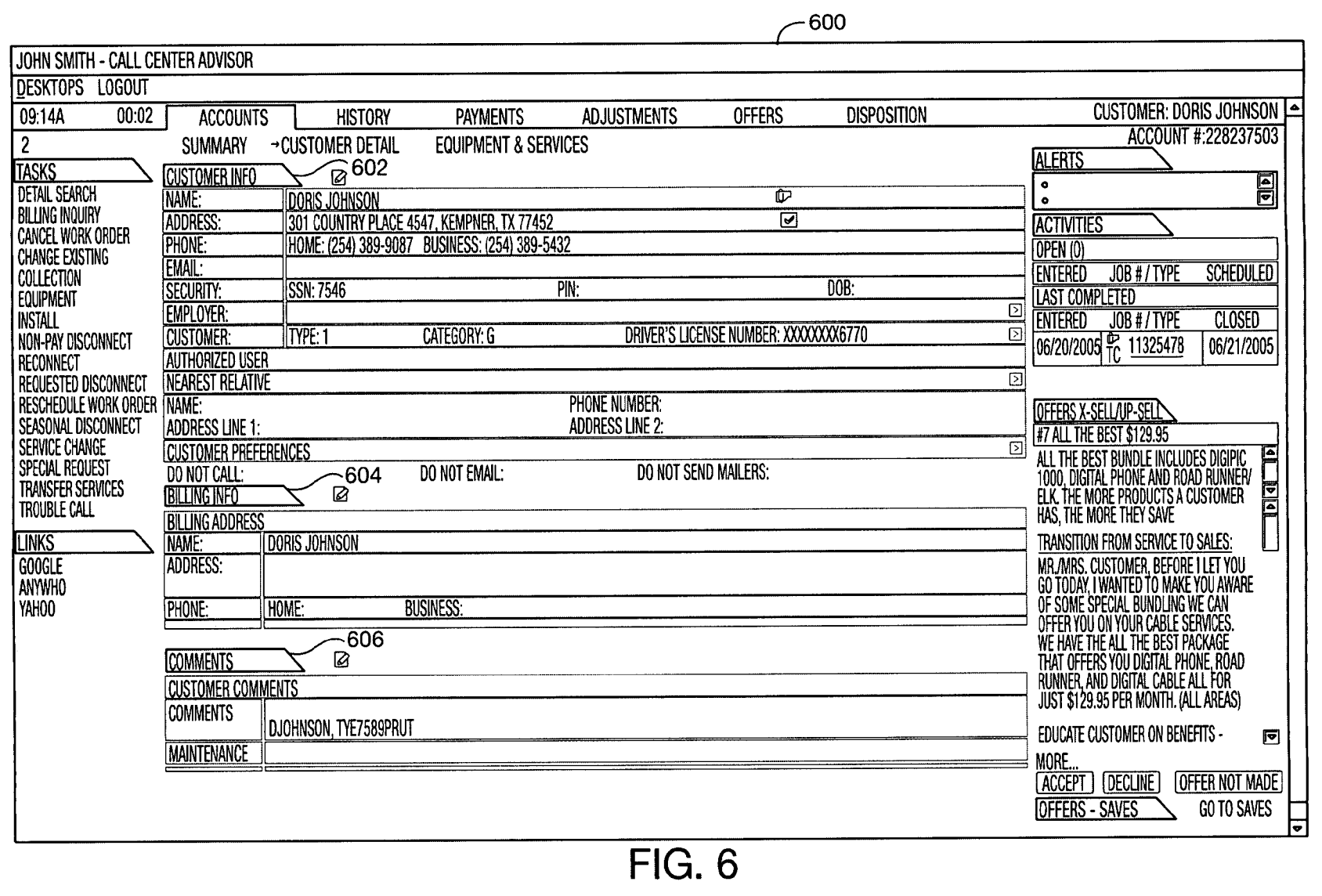

FIG. 6 illustrates an exemplary customer detail screen 600 displayed on an operator workstation display, e.g., display device 204 while servicing a customer call. The customer detail screen 600 provides an operator, i.e., CSR, the capability to edit or update customer information such as name change requests for the customer account, billing address updates, phone number changes/updates etc., while the CSR is handling the customer's call.

As illustrated in FIG. 6, the top portion of the screen includes customer information section identified by reference number 602 which contains information which is currently appears on customer's account. This information includes, e.g., customer's full name, address, phone number(s), e-mail, drivers license number etc. In some embodiments, this section 602 may also include confidential information associated with the customer such as last four digits of the customer's social security number. If a customer wishes to update, for example, his/her home address, phone number, etc., then, after verification, a CSR may help the customer by updating this information on exemplary screen 600.

As shown in FIG. 6, the center portion of the exemplary screen 600 includes a billing information section identified by reference number 604, where the CSR may update/change billing information for a customer. Billing information section 604 includes the customer's name as it appears on the billing statement, customer's billing address, phone number etc. It should be appreciated that a customer's billing address may be, and sometimes is, the same as customer's home address. However the billing address may be different in some cases. Towards the bottom of the exemplary screen 600, is a comments section 606 which gives the CSR an ability to take customer comments, e.g., notes as to why a customer needs to change information, and/or other comments made by the customer during the call.

Figure 7:
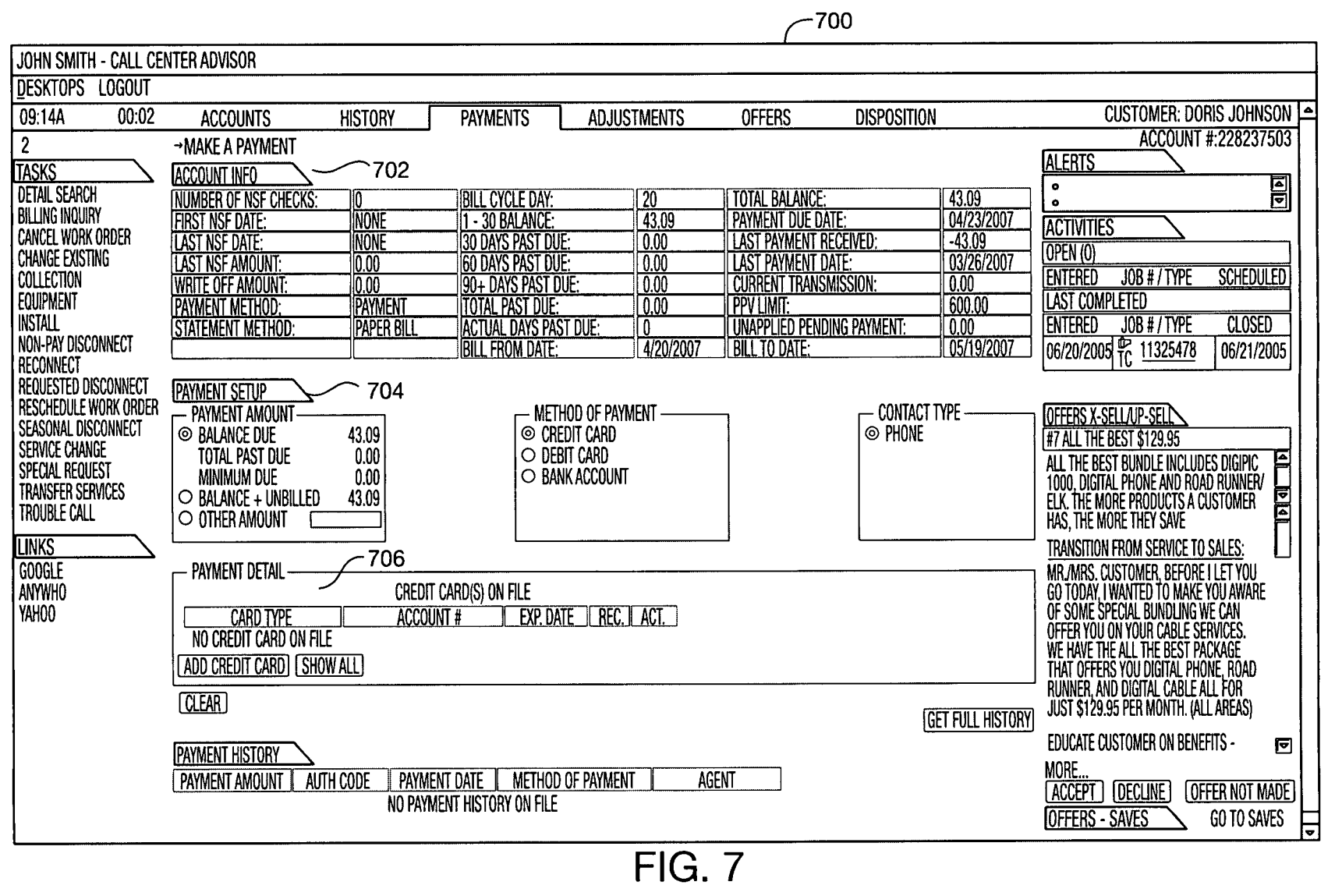

FIG. 7 illustrates an exemplary payment screen 700 displayed on an operator workstation display, e.g., display device 204 while servicing a customer call. The payment screen 700 includes information that a CSR may find useful while handling a bill payment and/or other payment related customer call. As illustrated in FIG. 7, the top portion of the screen includes an account information section identified by reference number 702 which includes information regarding the current billing statements as well as past billing statements, bill cycle days, balance as of current billing cycle, outstanding balance for more than certain number of days, due date of the payment, last payment date etc.

As shown in FIG. 7, towards the center portion of the exemplary screen 700 is the payment setup section identified by reference number 704. This section provides a information, for example, the balance due as of current billing period, total past payment due, minimum payable amount, other applicable service charges etc. The payment setup section 704 also gives the ability to the CSR to take payments from a customer using one of credit, debit and check payments. A CSR may select any of the payment method based on customer's preference and proceed to take payments. In some embodiments, using various options available on the exemplary screen 700, the CSR may also setup automatic recurring payments for the customer's due balance on the due date.

Further down from the center portion of the exemplary screen 700 is the payment detail section 706 which enables a CSR to add and/or update credit card information to a customer account. This allows the CSR to charge different credit cards for the due billing amount, once the customer authorizes such a payment. For example, at times it is possible that a customer may want to make a payment using a different/selective credit card, e.g., from a particular bank/financial institution etc., for some reason. In such a case it is helpful if information for more than one credit card can be added associated with the customer's account.

Figure 8:
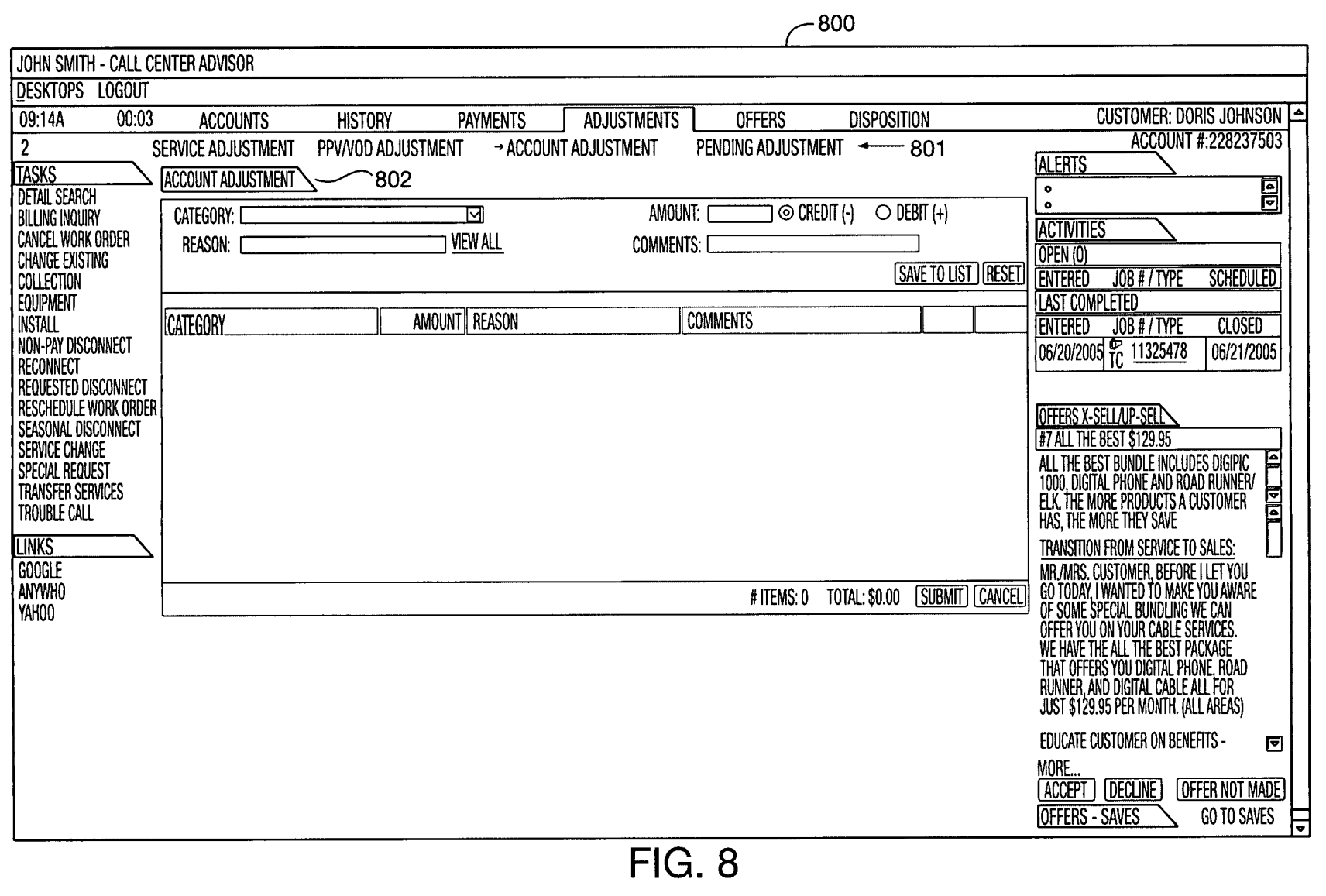

FIG. 8 illustrates an exemplary adjustments screen 800 displayed on an operator workstation display, e.g., display device 204 while servicing a customer call. The adjustments screen 800 includes information that a CSR may, and sometimes does, use while handling a customer call who, e.g., wishes to make adjustments to his/her services, account etc.

As shown in FIG. 8, towards the top of the screen 800 in the row generally indicated by reference number 801, the operator is provided with a plurality of tabs which can be used to access various sets of information, e.g., many of which allow the operator to make adjustments to one or more sets of customer information. For example, the operator can select from the row 801, any of the service adjustment tab, pay per view (PPV)/Video on demand (VOD) adjustment tab, account adjustment tab and pending adjustment tab, to gain access to a more detailed and or customized screen corresponding to the information associated with the particular tab. Any of the available tabs in 801 may be selected, e.g., by double clicking on the individual tab.

The exemplary screen 800 in FIG. 8 shows the account adjustment section 802, to illustrate the screen display when a CSR selects account adjustment tab from various tabs available in row 801. Using the account adjustment section 802, a CSR may make adjustments to a customer's account. For example, if it becomes known to a CSR that a customer has been overcharged in the last billing cycle, the CSR may credit the overcharged amount back to the customer or alternatively may subtract the overcharged amount from the customer's next bill. The PPV/VOD adjustment tab may be used by the CSR to make adjustments to pay per view and/or video on demand services available to the customer. For example a customer may request addition/deletion of pay per programs to/from the subscription plan that the customer may have. The service adjustment tab may be used by the CSR to make adjustment to services to which a customer is subscribed.

FIG. 9 illustrates an exemplary customer history screen 900 displayed on an operator workstation display, e.g., display device 204, while servicing a customer call. The customer history screen 900 includes past service related information and/or other information that a CSR may find useful while handling a customer call.

As illustrated in FIG. 9, the top portion of the screen 900 includes work order history section identified by reference number 902 which provides a list of each of the past and currently active work orders for the customer. In addition to listing each of the work orders, work order history section 902 also includes information on the status of those work orders, date when the work was scheduled, completion date, etc. Any of the shown work orders in section 902 may be selected, e.g., by double clicking on the individual work order, to present more detailed information about the selected work order. Such detailed work order information is shown in the center portion of the exemplary screen 900 as the work order detail section 904. Section 904 may include information about the work performed, responsible technician assigned to perform the work, amount billed for the work performed and other relevant information regarding the particular work order.

Figure 10:
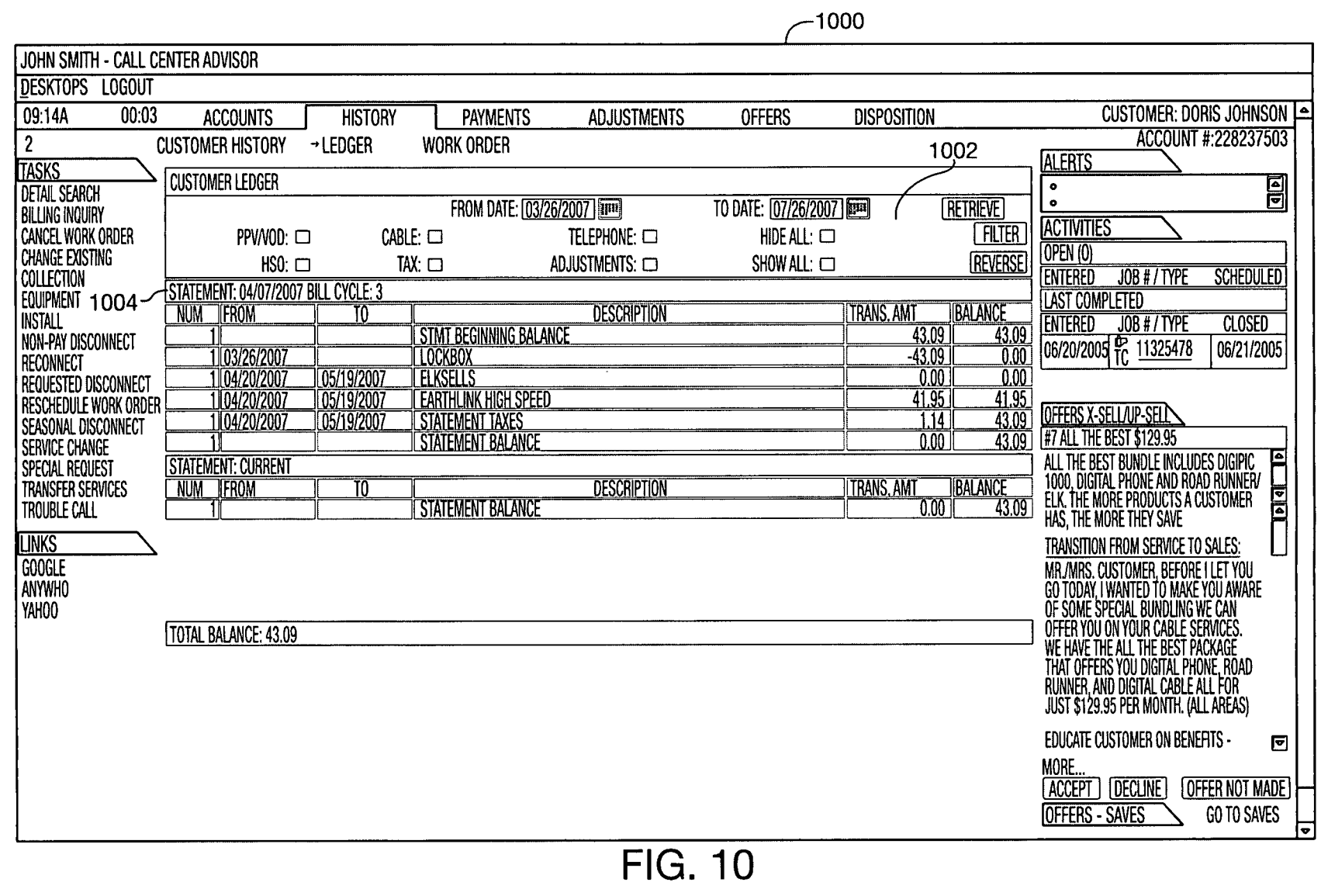

FIG. 10 illustrates an exemplary customer ledger screen 1000 displayed on an operator workstation display, e.g., display device 204, while servicing a customer call. The customer ledger screen 1000 includes billing and/or other ledger information associated with a customer's account, which a CSR may find useful while handling a customer call.

As illustrated in FIG. 10, the top portion of the screen 1000 includes a customer ledger selection section identified by reference number 1002 which enables a CSR to filter customer ledger information based on different billing categories, e.g., PPV/VOD, cable, telephone, Internet etc. Section 1002 lets the CSR retrieve billing information by selecting the billing period, e.g., starting and ending dates, and one or more of the available billing categories. Based on the selected billing category and dates entered by the CSR, a detailed section providing, e.g., billing and/or payment information, opens up on the screen 1000. For illustration, exemplary screen 1000 shows a statement section 1004 that opens up in the center portion of the exemplary screen 1000. The statement section 1004 includes, for example, details of current billing statement and/or a past billing statement information. The information in section 1004 also includes a description of services and corresponding amount billed for those services, e.g., during a particular billing cycle. The statement section 1004 may further include information about any balance amount that was carried over from a previous billing cycle to the next, total balance due as of date etc.

Figure 11:
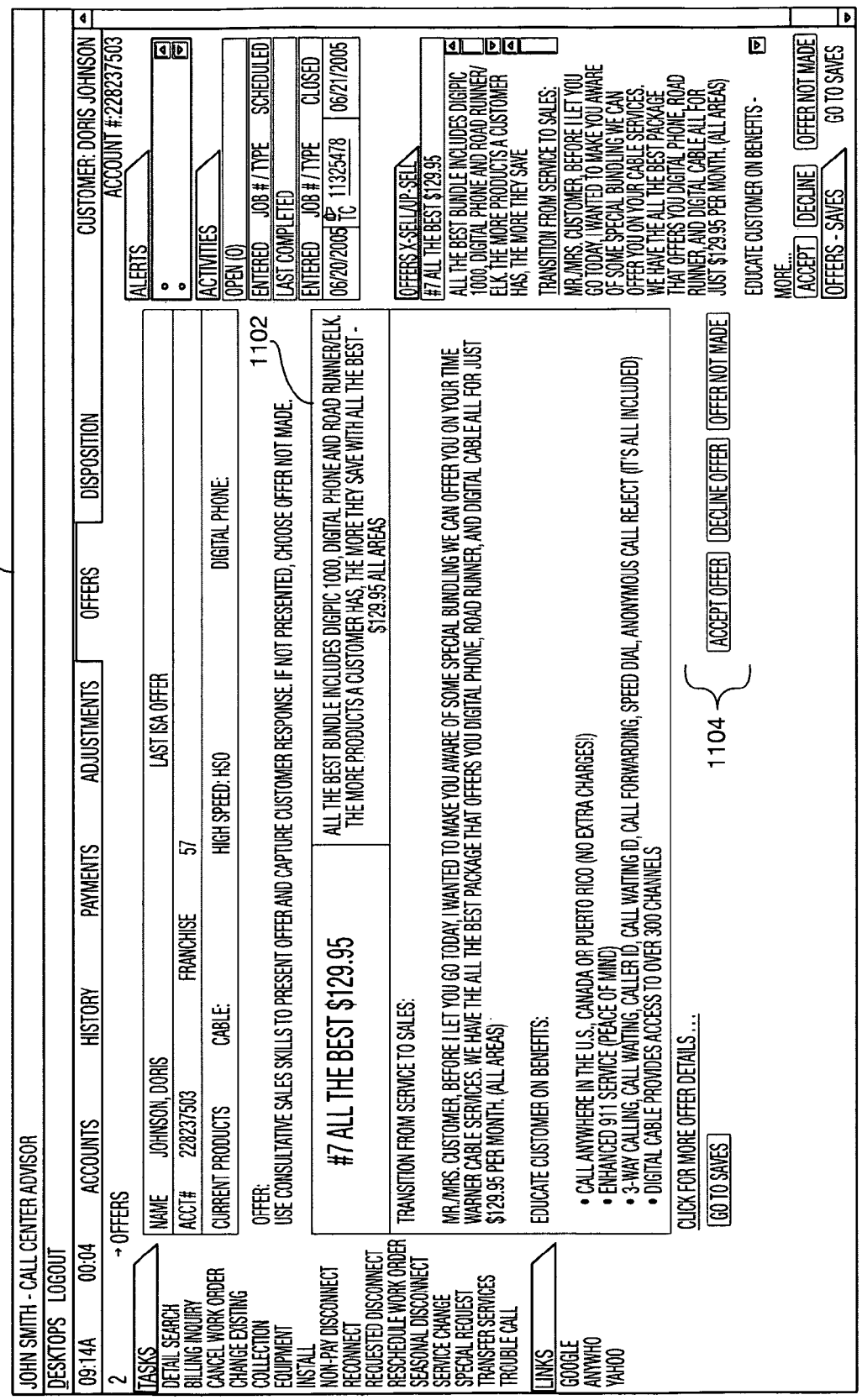

FIG. 11 illustrates an exemplary offer screen 1100 displayed on an operator workstation display, e.g., display device 204, while servicing a customer call. The offer screen 1100 provides the CSR an interface to the suggested marketing/business offers specific to the customer that CSR is handling. In accordance with the invention, the marketing/business offers are driven off of customer specific data such as current services, serviceability, geographic location, competitive offer potential, credit scoring and other relevant data. As discussed earlier, in some embodiments such marketing/business offers are generated by the AAD system, e.g., by the AAD system 118 using decision module 122. The exemplary screen 1100 not only guides the CSR through the sales process, but also facilitates capturing of data that allows for reporting on the success of the CSR as well as the success of the marketing/business offer in particular segments.

As shown in FIG. 11, the exemplary screen 1100 includes, among other information, a detailed offer section identified by reference number 1102. The offer section 1102 provides detailed script that may be used by the CSR in cross-selling and/or up-selling products and/or services. Section 1102 includes sub-sections including information, for example, advantages of using the service/product that the customer is being offered, benefits and or discounts that the customer may receive if offer is accepted, amount of money saved by the customer if the offer is accepted during the call compared with what the customer might have to pay for the same service/product otherwise etc.

Towards the bottom of the exemplary screen 1100, appears another section indicated by reference number 1104 and which provides the CSR with a plurality of tabs that can be used to capture customer's response to the business offer made. Section 1104 includes, e.g., an accept offer tab, a decline offer tab, and an offer not made tab. The CSR may record the customer's response to business offer made during the call simply, e.g., by clicking on one of the available tabs. In the event when the offer is not made, the CSR may just click on the offer not made tab.

Figure 12:
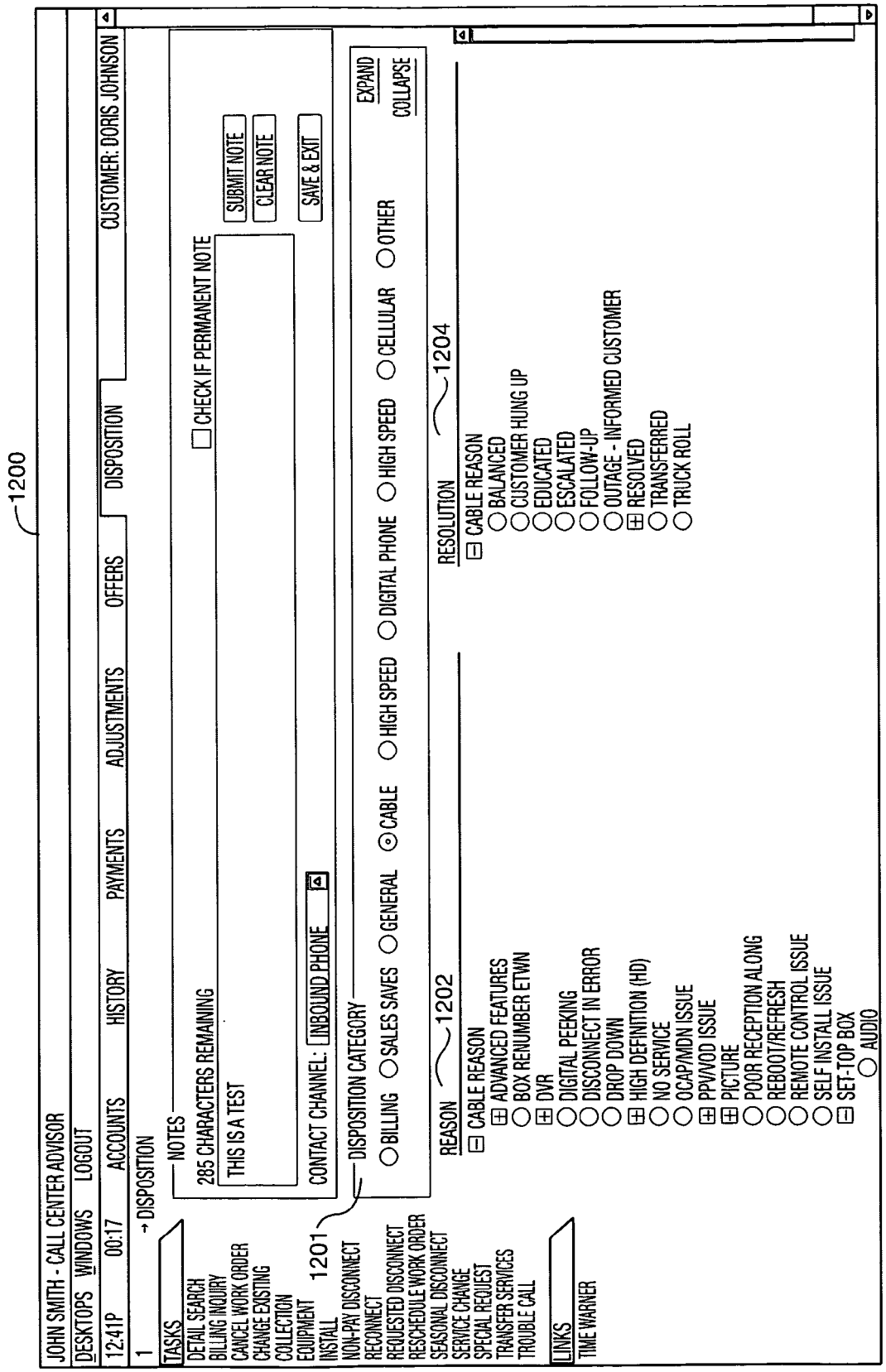

FIG. 12 illustrates an exemplary disposition screen 1200 displayed on an operator workstation display, e.g., display device 204, while servicing a customer call. The disposition screen 1200 provides a CSR the ability to capture call information that can be used for performing analysis and generating various reports, in accordance with the methods presented in this invention. The captured call data and/or information helps service provider to understand the types of calls that different regional offices, e.g., different divisional headends, are getting and how they are being handled by the CSRs. The captured call data as well as the generated reports may significantly help in improving customer service operations, for example, different divisional headends may use this data to better align their call queues and staffing levels.

As shown in FIG. 12, the exemplary screen 1200 includes, among other information, a disposition category section 1201, a call reason section 1202 and a resolution section 1024. The disposition category section 1201 includes various selectable categories such as billing, sales, general, cable, high speed internet, digital phone, cellular phone, and other. Using the disposition category section 1201, the CSR may select any of the categories depending on the nature of customer's call received. For example, if the CSR receives a billing related inquiry, then the CSR may select a billing category. Once the CSR selects one of the categories from section 1201, the call reason section 1202 automatically becomes available with various selectable sub-categories for call reasons corresponding to the selected disposition category. Based on the primary reason of call, the CSR may select a reason from the available call reason options. Once the CSR selects one of the call reasons from section 1202, the resolution section 1204 automatically becomes available with various selectable options. Depending on the resolution provided for the problem for which the customer called, the CSR may select an appropriate resolution from the available options. The captured call reason and resolutions may be reported, for example, to a central server/system or any system where the call data may be analyzed.

Figure 13:
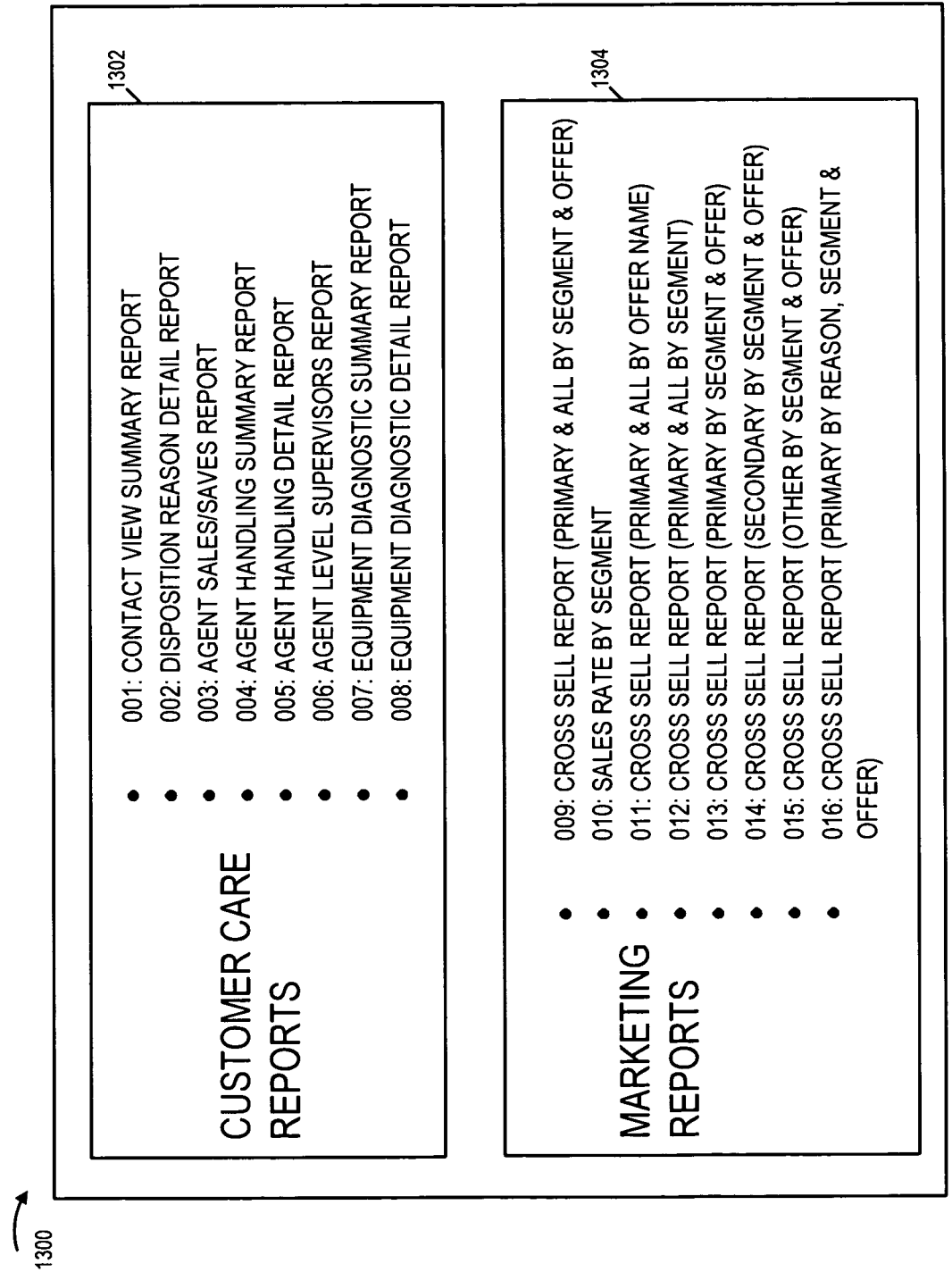
FIG. 13 illustrates an exemplary set of reports that are generated in accordance with the present invention.

FIG. 13 illustrates an exemplary set of reports 1300 that are generated in accordance with the present invention. It should be appreciated that the set of reports being discussed in FIG. 13 may include other additional reports, and should be not be considered as limiting the number of reports generated in accordance with the invention, to only those discussed in FIG. 13.

As shown in FIG. 13, the set of reports 1300 includes two subsets of reports, i.e., customer care reports 1302 and marketing reports 1304. The first subset of reports, i.e., the customer care reports include a contact view summary report 001, a disposition reason detail report 002, an agent, i.e., CSR sales/saves report 003, agent handling summary report 004, agent handling detail report 005, agent level supervisors report 006, equipment diagnostic summary report 007, equipment diagnostic detail report 008.

The second subset of reports, i.e., the marketing reports 1304 include a cross sell report 009, a sales rate by segment report 010, a cross sell report 011, a cross sell report 012, a cross sell report 013, a cross sell report 014, a cross sell report 015 and a cross sell report 016.

The contact view summary report 001 contains information regarding the types of cases that are handled by various different agents, i.e., CSRs, and separates the information by contact channel, product segment and customer value segments.

The disposition reason detail report 002 contains call disposition categories, reason for calls, and resolutions recorded by the agents. The agent sales/saves report 003 includes information regarding tenures and sales performance of various agents, i.e., CSRs. For example, the agent sales/saves report 003 may provide information to, e.g., a supervisor reviewing the report, as to how much of sales have been achieved by various agents handling customer calls.

The agent handling summary report 004 includes information, e.g., summary information about performance of various agents including total number of cases handled, disposition rate, average handling time taken by an agent, and login duration. The agent handling detail report 005 includes detailed information regarding performance of various agents including total number of calls handled, disposition rate and disposition details. The agent level supervisors report 006 includes key metrics for agent performance in one report including: number of cases handled, dispositions, presented and accepted rates, escalation, truck roll and adjustment rates.

The equipment diagnostic summary report 007 includes information, e.g., types of hits and boxes by node, product segment, customer value, play type, etc., at division level. The equipment diagnostic detail report 008 includes more detailed information, for example, types of hits, and boxes by node, product node, product segment, customer value, play type, etc. at agent level.

In the second subset of reports 1304, the cross sell report 009 includes information on presented and accepted rates of business offers for a division by product segment and offer name for primary and all offers. The sales rate by segment report 010 include information on sales performance of cross sell offers for a division by product segment.

The cross sell report 011 includes information on presented and accepted rates of business offers for a division by offer name for primary and all offers. The cross sell report 012 includes information on presented and accepted rates of business offers for a division by product segment for primary and all offers. The cross sell report 013 includes information on presented and accepted rates of business offers for a division by product segment and offer name for primary offers.

The cross sell report 014 includes information on presented and accepted rates of business offers for a division by product segment and offer name for secondary offers. The cross sell report 015 includes information on presented and accepted rates of business offers for a division by product segment and offer name for other offers. The cross sell report 016 includes information on presented and declined counts and declined rates of business offers, for a division, by reason code, product segment and offer name for primary offers.

Figure 14:
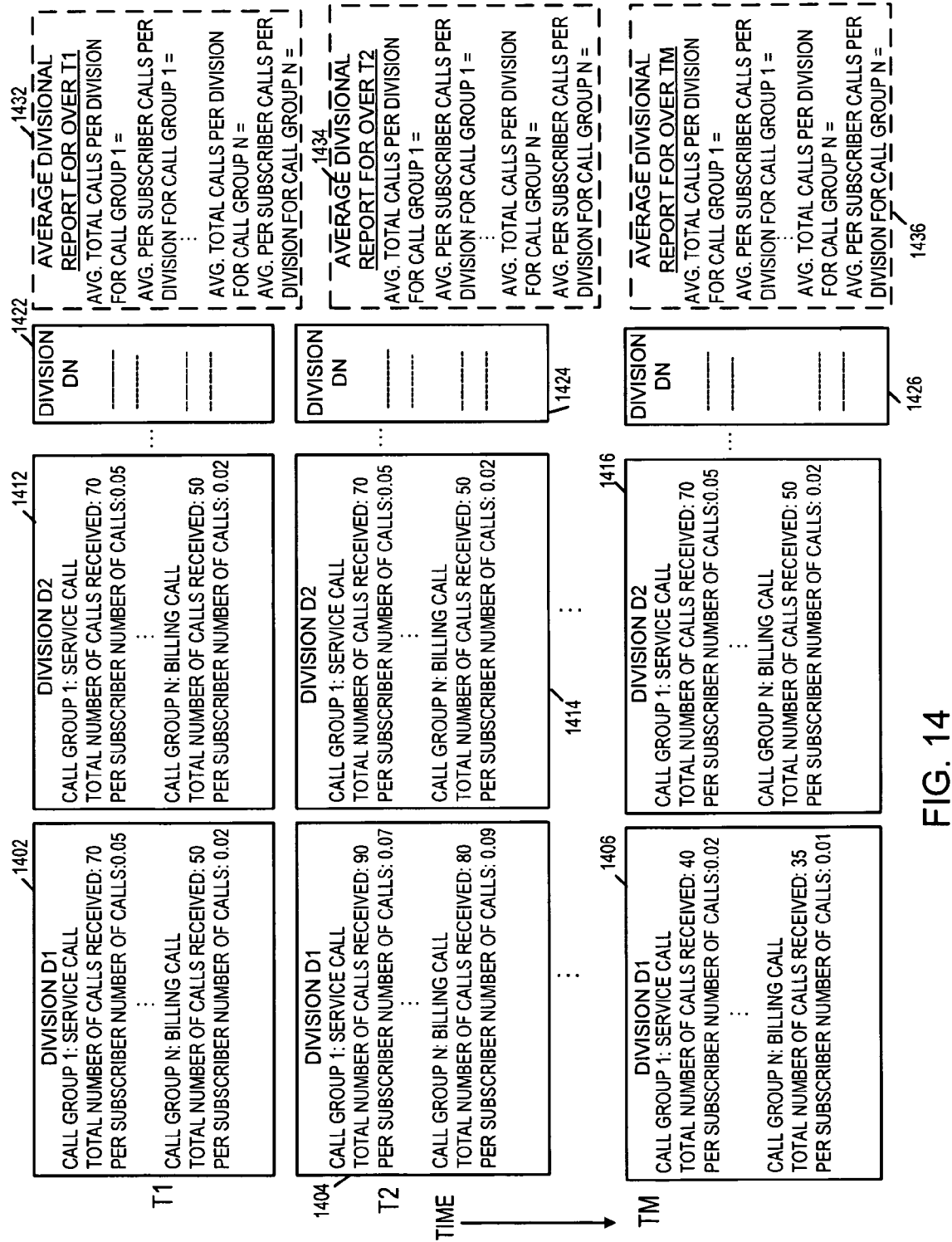
FIG. 14 illustrates various generated divisional reports and average divisional reports over a period of time analyzed to identify the divisions having problems.

FIG. 14 illustrates a set 1400 of exemplary reports generated in accordance with one exemplary embodiment. The reports 1400 include reports corresponding to first through Mth time periods (T1, T1, . . . TM). The M time periods correspond to an extended time interval. During each time interval T1, T2, TM, divisional reports are generated on a per division basis. For example, in time period T1, a first divisional call report 1402 is generated for division D1, a second divisional call report 1412 is generated for division D2 and an Nth. division call report 1422 is generated for division DN. Similarly, for time period T2, divisional call reports 1404, 1414, 1424 are generated for divisions D1, D2, DN. Divisional call reports are generated, at the end of each division call reporting time period, for multiple time periods with the reports 1406, 1416, 1426 being generated for the last time period M in an extended time period including M divisional call reporting time periods. Divisional call reporting time periods may be, e.g., a set number of hours in duration or a day in duration. Hourly time periods are preferable where a finer granularity of call reports is desired and can be useful in detecting patterns of calls during the day.

Each of the exemplary divisional call reports, e.g., report 1402, includes information for different types of call groups. Call groups may be defined in a plurality of different ways, e.g., based on the type of call or call queue to which a call was assigned in combination with other category information such as the reason for the call and/or the disposition of the call. In the example shown in FIG. 14, call group 1 corresponds to a service call which was initiated by a customer encountering a disruption in service. Such calls may be indicative of network problems due to weather related cable damage and/or other network faults. Call information for an Nth type of call group is also included in the report. Group N calls are billing calls where there was an overcharge inquiry being made. Such calls may be indicative of a systematic error in a billing system, e.g., a misinterpretation of billing codes by the first or second billing system 112, 114, if detected on a large scale.

Various types of information may be included in each divisional call report reports. For example, in report 1402, for each call group for which information is included, the report includes, on a per call group basis, the total number of calls received at the division during the time period T1 and a normalized number of calls, e.g., a per subscriber number of calls. While a per subscriber number of calls is indicated, rather than using a normalized per subscriber basis, it may be preferable to uses 1000 subscribers as the basis for the normalized value. By normalizing the number of calls to reflect how many calls are received for a particular number of subscribers, call rate information can be compared from one division to another. Comparing simply total numbers of calls from one division to the next could result in misinterpretation of rates across divisions since some divisions may correspond to regions with much greater population densities and thus numbers of subscribes than other regions.

Using the information from various divisions during an individual time period, e.g., T1, T2, TM, an average divisional report is generated in some embodiments. For example exemplary average divisions report 1432 is generated for time period T1, while average divisional reports 1434 and 1436 are generated for time periods T2 and TM respectively. Each exemplary average divisional report 1432 includes, based on the divisional report information for the corresponding time period, an average total number of call received per division for each of the different call groups listed in the report and, perhaps more importantly, the average number of calls for each call group on a normalized, e.g., per subscriber, basis. The averages may be generated by summing the corresponding numbers for each division and dividing by the total number of divisions N to generate the average for each call group.

In some embodiments, the information in the average divisional report for a given time period is compared to the information in individual division reports to identify divisions and corresponding services/network elements at the division, which are underperforming relative to other divisions. While the example is based on averages, it should be appreciated that a variety of statistical techniques such as deviation from a mean, etc., could be used instead of comparing average values to individual division values to identify divisions receiving a higher than expected number of calls corresponding to an individual call group. Alerts may be generated and sent when a division is found to be underperforming in one or more call groups, e.g., as may be indicated by a per subscriber number of calls more than a predetermined amount above the average divisional per subscriber call rate.

As will be discussed further below, at the end of an extended time interval, e.g., after M time periods, the reports and/or call information can be analyzed for a division to determine if changes in the number of calls differ significantly, e.g., by a predetermined amount, as may be indicative of a problem. As should be appreciated when performing such analysis it is useful to compare similar time periods, e.g., time periods corresponding to the same time of day over a multiple business days, so that different call rates due to simply the time of day do not generate false alerts.

Figure 15:
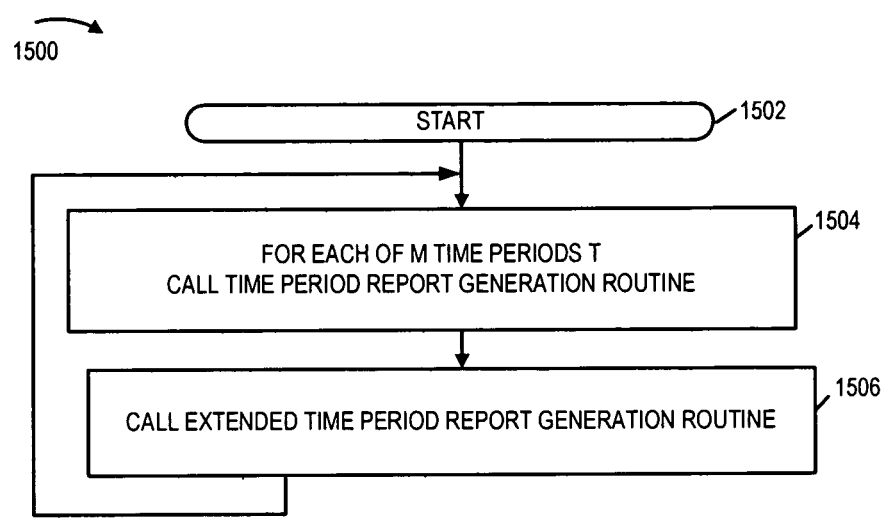
FIG. 15 illustrates a flowchart of an exemplary method of invoking different functions/routines in order to initiate generation of various reports in accordance with the present invention.

FIG. 15 illustrates the steps of an exemplary report generation and analysis routine 1500. The routine 1500 begins in start step 1502 and proceeds to step 1504. In step 1504 for each of M time periods a call is made to the time period report generation routine, e.g., routine 1600 shown in FIG. 16. At end of M time periods M sets of division reports will have been generated with each set corresponding to one of the M time periods and operation will proceed to step 1506. In step 1504 for each of the M time periods, a separate report for each of a plurality of divisions, e.g., N divisions, may be generated along with an average divisional report. In some embodiments, the contents of the average divisional report are included along with the contents of an individual division report so that the recipient of the report can see the results of the division as compared to the average divisional results in terms of call numbers per call category.

In step 1506 a call is made to the extended time period report generation routine which generates one or more reports based on the calls received in M time periods. Upon returning from step 1506 operation proceeds once again to step 1504. In this manner time call information is processed and generated for individual time periods as well as extended time intervals on an ongoing basis as the information is made available to the AAD system for processing.

Figure 16:
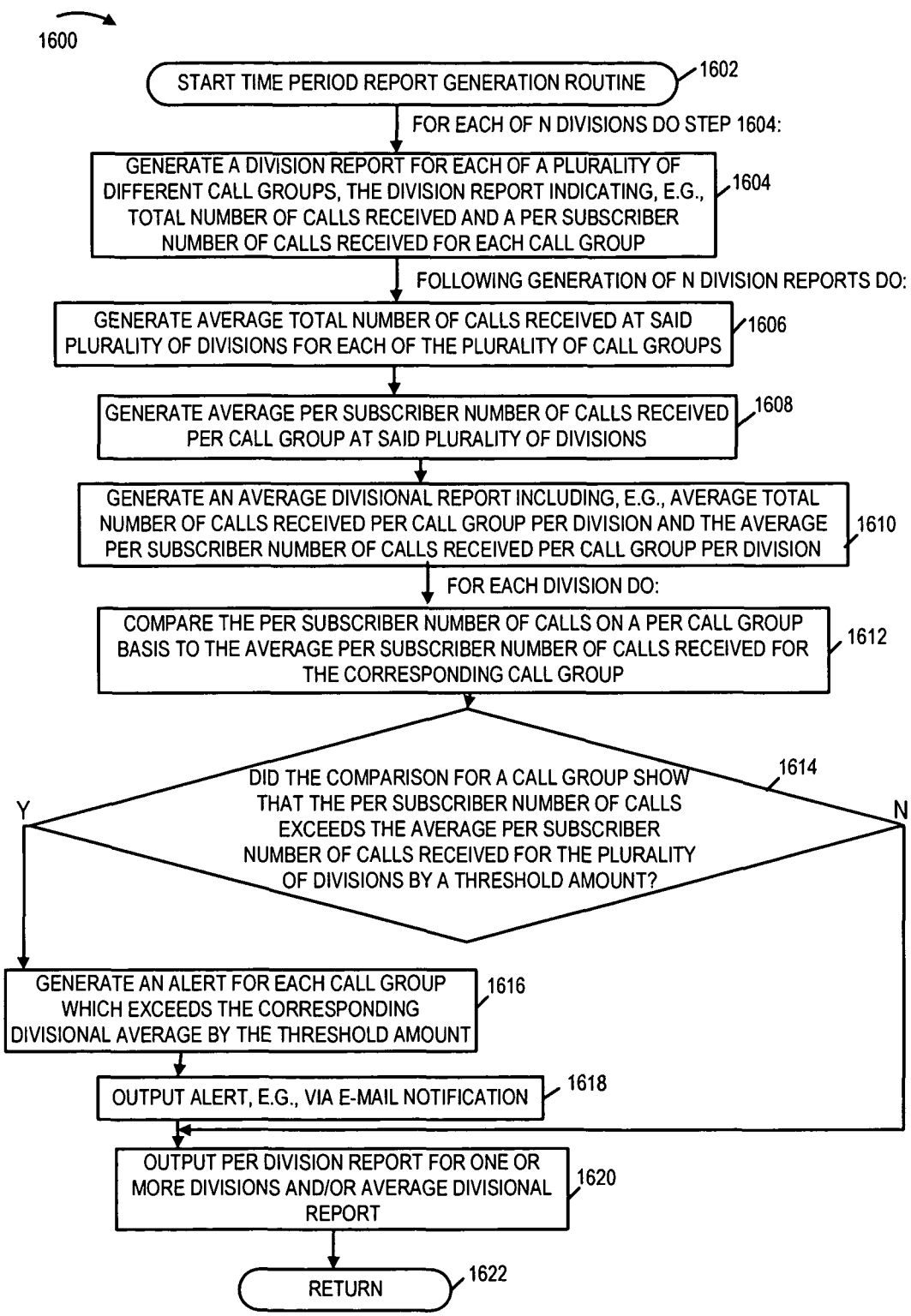
FIG. 16 illustrates a flowchart of an exemplary method of generating and comparing various divisional reports and average divisional reports over a period of time in accordance with the present invention.

FIG. 16 illustrates the steps of a time period report generation routine 1600 which starts, in step 1602, at the end of a call information reporting time period, e.g., in response to being called by routine 1500. Routine 1600 may be called once for each time period T1 shown in, e.g., FIG. 14.

Operation proceeds from start step 1602 to step 1604 which is performed for each of a plurality of N divisions and results in generation of a division call report for each of the individual N divisions. In step 1604, a division report is generated for each of a plurality of call groups with the generated division report indicating, for example, the total number of call received and a per subscriber number of calls received for each call group. Rather than on a per subscriber basis, the number of calls may be based on some other basis, e.g., per 1000 subscribers. At the end of step 1604, N division reports exist, e.g., 1402, 1412, 1422, one per division for the given time period, e.g., time period T1.

From step 1604 operation proceeds to step 1606 in which an average total number of calls received at said plurality of divisions is generated on an individual call group basis, e.g., with an average total number being generated for each call group. As noted above, given that different divisions may have vastly different numbers of subscribers, this number may not be particularly useful for comparison purposes with the total number of calls for an individual division. In step 1608, an average per subscriber number of calls received is generated on a per call group basis taking into consideration the number of calls received at the different divisions and the number of subscribers at each division. As discussed above, this normalized value may be on a 1000 subscriber basis or some other basis, rather than an individual subscriber basis. This normalized average value per call group is useful for comparison purposes across divisions. The values generated in steps 1606 and 1608 are, in some embodiments, used to generate an average divisional call report, such as report 1432 shown in FIG. 14.

Operation proceeds from step 1610 with the remaining steps 1612, 1614, 1616, 1618, 1620 being implemented on a per division basis, e.g., once for each of N divisions. In step 1612, the per subscriber number of calls which were received at a division are compared to the average per subscriber number of calls received for the corresponding call group. The results of this comparison are then considered in step 1614. In step 1614 a determination is made as to whether or not the comparing for a call group showed that the per subscriber number of calls exceeds the average per subscriber number of call received for the plurality of divisions by a threshold amount, e.g. by 50%, 100% or 200% in some embodiments with the threshold having been selected to be indicative of a significant difference possibly indicating anomalies at the division with regard to the particular call group exceeding the threshold.

For each call group for which the threshold is not exceeded, operation proceeds from step 1614 to step 1620. However, call groups for which the compared values exceed the threshold cause operation to proceed from step 1614 to step 1616 in which an alert is generated for each call group for which the threshold was exceeded. Then in step 1618 the alerts are output, e.g., by sending an E-mail or data report including an alert to one or more individuals at the division which trigger the alert. In this manner individuals at the appropriate division are altered to the need to look into network problems and/or other conditions which may be causing the higher than normal number of calls for a call group.

After the alert or alerts is output in step 1618 operation proceeds to step 1620 wherein division reports generated for an individual time period T1, T2, or TM are output, e . . . , via E-mail or as data reports to the corresponding divisions. The time periods reports may include all or some of the average divisional information generated in steps 1606, 1608 to facilitate interpretation of the information included in the generated report.

With the generated reports having been output in step 1620, operation proceeds to return step 1622 wherein control of processing is returned to the routine which called routine 1600.

Figure 17:
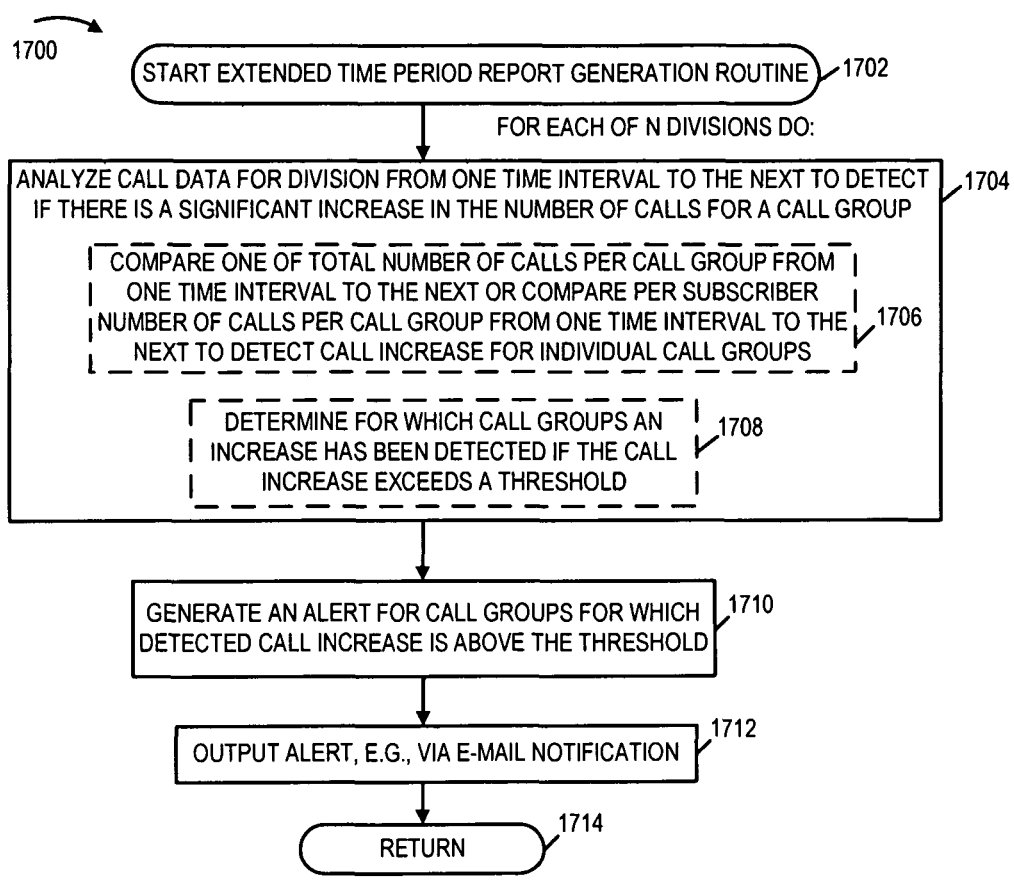
FIG. 17 illustrates a flowchart of an exemplary method of analyzing call data in various generated divisional reports over an extended time period of time in accordance with the present invention.

FIG. 17 illustrates the steps of an extended time period report generation routine 1700 which may be called by the routine 1500 shown in FIG. 15, e.g., at the end of M time periods. The routine 1700 starts in step 1702 when it is called by a higher level routine. Operation then proceeds to steps 1704 to 1712 which are performed for each of the N divisions. In step 1704 the call data for a division is analyzed to determine if there is a significant increase in the number of calls for a call group between two different time periods, e.g., two sequential time periods or two time periods occurring at the same time of day on different days. Step 1704 may and in some embodiments is, implemented by comparing the total number of calls from one time period to the total number of calls for another time period on a per call group basis to detect if there has been an increase in the number of calls for any to the individual call groups. Then in sub-step 1708 for those call groups for which an increase has been detected, a determination is made as to whether or not the amount of the increase is significant, e.g., whether the difference in calls exceeds a threshold used to identify significant changes in the number of calls. An alternative method of detecting significant increases in call volume for a particular call group may be made using more complicated analysis techniques as an alternative to the simple comparison approach just described.

Operation proceeds from step 1704 to step 1710 wherein an alert for call groups for which detected call increases which are significant are generated. The alerts may be in the form of a E-mail and/or data report indicating the detected call increases and the call categories for which significant increases have been detected. In step 1712 the generated alert or alerts are output, e.g., via E-mail or by sending a data file to the division to which the generated alert corresponds. Once the processing of the division data has been completed for each of the N divisions, operation returns via step 1714 to the routine which called the extended time period report generation routine 1700.

As should be appreciated, the processing performed by the routine 1700 shown in FIG. 17 can be viewed as processing the columns of information reports shown in FIG. 15 on a per column basis, e.g., a per division basis. This is in contrast to the processing performed in by the routine 1600 shown in FIG. 16 which can be viewed as processing the rows of information reports shown in FIG. 15 on a per time period basis. The processing shown in either of FIGS. 16 and 17 can be used to produce useful and timely alerts based on call information and may be used independent or in combination.

In various embodiments system elements described herein are implemented using one or more modules which are used to perform the steps corresponding to one or more methods of the present invention, for example, receiving calls, e.g., via a CT1. Such modules may be implemented using software, hardware or a combination of software and hardware. Each step may be performed by one or more different software instructions executed by a processor, e.g., CPU.

At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method comprising:
   receiving customer service calls from service subscribers corresponding to a plurality of different divisions of a company;
   assigning the individual received calls, from said received customer service calls, to call queues based on the reason for the individual calls;
   storing call disposition information indicating the disposition of customer service calls, said stored call disposition information indicating a reason for each of the customer service calls and an action taken to address the reason for each of the customer service calls;
   generating a plurality of division reports, different division reports corresponding to different divisions, different divisions corresponding to different geographic service regions, each individual report of said plurality of division reports indicating a ratio of a number of customer service calls of a first type, received during a predetermined time period from service subscriber of the division to which the individual report corresponds, to a predetermined number of service subscribers;
   automatically determining if a division is encountering a problem by comparing the information included in reports corresponding to different divisions that indicate a number of calls for a first particular reason, above a threshold level, to identify disparities between different divisions with regard to the number of calls for said first particular reason;
   generating an alert when it is determined that a division is encountering a problem, said generating an alert including providing information on the call reason which triggered the alert; and
   wherein the call reason is one of a network fault condition, billing error, or faulty service by a company technician.

2. The method of claim 1,
   wherein the predetermined number of service subscribers is one; and
   wherein the ratio of the number customer service calls of the first type received, during a predetermined time period indicates the per subscriber number of calls of the first type relieved, during said predetermined time period, for the division to which the division report corresponds.

3. The method of claim 1, wherein said call queues include at least two of:
   a service call queue;
   a billing inquiry queue; and
   a sales queue.

4. The method of claim 3,
   wherein said call queues include a service call queue.

5. The method of claim 4,
   wherein said call queues include a billing inquiry queue.

6. The method of claim 3,
   wherein said call queues include a billing inquiry queue.

7. The method of claim 3,
   wherein said call queues include a sales queue.

8. The method of claim 1, further comprising:
   generating a report including information obtained from said stored call disposition information.

9. The method of claim 8, wherein generating a report includes:
   grouping call information according to different disposition categories indicated by said stored call disposition information; and
   incorporating information on the resolution of calls corresponding to the different disposition categories.

10. The method of claim 9, further comprising:
    incorporating in said report information indicating the reasons for calls received for a disposition category.

11. The method of claim 1, further comprising:
    generating a plurality of division reports for a division over an extended period of time, each of said division reports corresponding to a different time period;
    compare call data in sequential reports corresponding to a division to determine if there has been an increase in calls of the first type between reporting time periods to which the reports correspond; and
    automatically generating an alert when a division report indicates an increase in calls from one reporting time period to the next over a predetermined percentage change.

12. A method comprising:
    receiving customer service calls from service subscribers corresponding to a plurality of different divisions of a company;
    assigning the individual received calls, from said received customer service calls, to call queues based on the reason for the individual calls;
    storing call disposition information indicating the disposition of customer service calls, said stored call disposition information indicating a reason for each of the customer service calls and an action taken to address the reason for each of the customer service calls;
    generating a plurality of division reports, different division reports corresponding to different divisions, different divisions corresponding to different geographic service regions, each individual report of said plurality of division reports indicating a ratio of a number of customer service calls of a first type, received during a predetermined time period from service subscriber of the division to which the individual report corresponds, to a predetermined number of service subscribers;
    automatically determining if a division is encountering a problem by comparing the information included in reports corresponding to different divisions that indicate a number of calls for a first particular reason, above a threshold level, to identify disparities between different divisions with regard to the number of calls for said first particular reason;

generating a plurality of division reports for a division over an extended period of time, each of said division reports corresponding to a different time period;

comparing call data in sequential reports corresponding to a division to determine if there has been an increase in calls of the first type between reporting time periods to which the reports correspond; and automatically generating an alert when a division report indicates an increase in calls from one reporting time period to the next over a predetermined percentage change, said alert being generated when said increase in calls is an increase of at least 20%.

13. The method of claim 1 further comprising:

automatically generating an alert when a division report indicates calls for a call category corresponding to reporting of a service or billing problem for one division exceeds an average call level generated from call information from multiple divisions for the call category by a predetermined amount.

14. A system for processing customer service representative call data comprising:

a memory;

a processor coupled to said memory;

an extended time period report generation module, stored in said memory, for generating a plurality of division reports for a division over an extended period of time, different division reports corresponding to different divisions, each individual report of said plurality of division reports indicating a ratio of a number of customer service calls of a first type received during a predetermined time period from service subscriber of the division to which the individual report corresponds to a predetermined number of service subscribers; and an alert generation module, stored in said memory, for automatically generating an alert when a division report indicates a significant increase in calls, relative to the division report for the same division in an immediately preceding report period, for a call category corresponding to reporting of a service or billing problem, said alert being generated when said increase is an increase of at least 20% relative to the preceding report period.

15. The system of claim 14, further comprising:

a time period report generation module, stored in said memory, for generating a plurality of division reports corresponding to different divisions for a given time period; and wherein said alert generation module is also for generating an alert when a division report indicates calls for a call category corresponding to reporting of a service or billing problem for one division exceeds an average level generated for multiple divisions for the call category by a predetermined amount.

* * * * *